United States Patent
Imura et al.

(10) Patent No.: US 6,876,448 B2
(45) Date of Patent: Apr. 5, 2005

(54) SPECTRAL CHARACTERISTIC MEASURING APPARATUS AND METHOD FOR CORRECTING WAVELENGTH SHIFT OF SPECTRAL SENSITIVITY IN THE APPARATUS

(75) Inventors: Kenji Imura, Toyohashi (JP); Susumu Ichikawa, Ichinomiya (JP)

(73) Assignee: Minolta Co., Ltd., Osaka (JP)

( * ) Notice: Subject to any disclaimer, the term of this patent is extended or adjusted under 35 U.S.C. 154(b) by 291 days.

(21) Appl. No.: 10/193,291

(22) Filed: Jul. 12, 2002

(65) Prior Publication Data

US 2003/0011767 A1 Jan. 16, 2003

(30) Foreign Application Priority Data

Jul. 12, 2001 (JP) ........................................ 2001-212547
May 16, 2002 (JP) ........................................ 2002-142015

(51) Int. Cl.[7] ................................................ G01J 3/28
(52) U.S. Cl. ...................... 356/326; 356/319; 356/73; 250/252.1
(58) Field of Search ............................ 356/301, 73, 72, 356/319, 323, 325, 326, 328, 317, 378, 408, 425; 250/461.1, 252.1

(56) References Cited

U.S. PATENT DOCUMENTS

| 5,636,015 A | | 6/1997 | Imura et al. |
| 6,020,959 A | * | 2/2000 | Imura ......................... 356/319 |
| 6,535,278 B1 | * | 3/2003 | Imura ......................... 356/73 |

* cited by examiner

Primary Examiner—Layla Lauchman
(74) Attorney, Agent, or Firm—McDermott Will & Emery LLP

(57) ABSTRACT

A spectral characteristic measuring apparatus is provided with a memory and a CPU. The memory stores a spectral profile output from a sample light sensor array when light from a lamp is received, and a plurality of spectral profiles to be output from the sensor array at each displaced position in the case where a light separator is displaced relative to a grating member of the sensor array at a certain pitch stepwise in a wavelength diffusing direction. The CPU controls the lamp to emit light in a state that a white plate for calibration is disposed as a sample, compares a spectral profile output from the sensor array for correction with each spectral profile stored in the memory, and sets a displacement amount corresponding to the spectral profile that is most approximate to the corrective spectral profile as a wavelength shift correction amount.

16 Claims, 18 Drawing Sheets

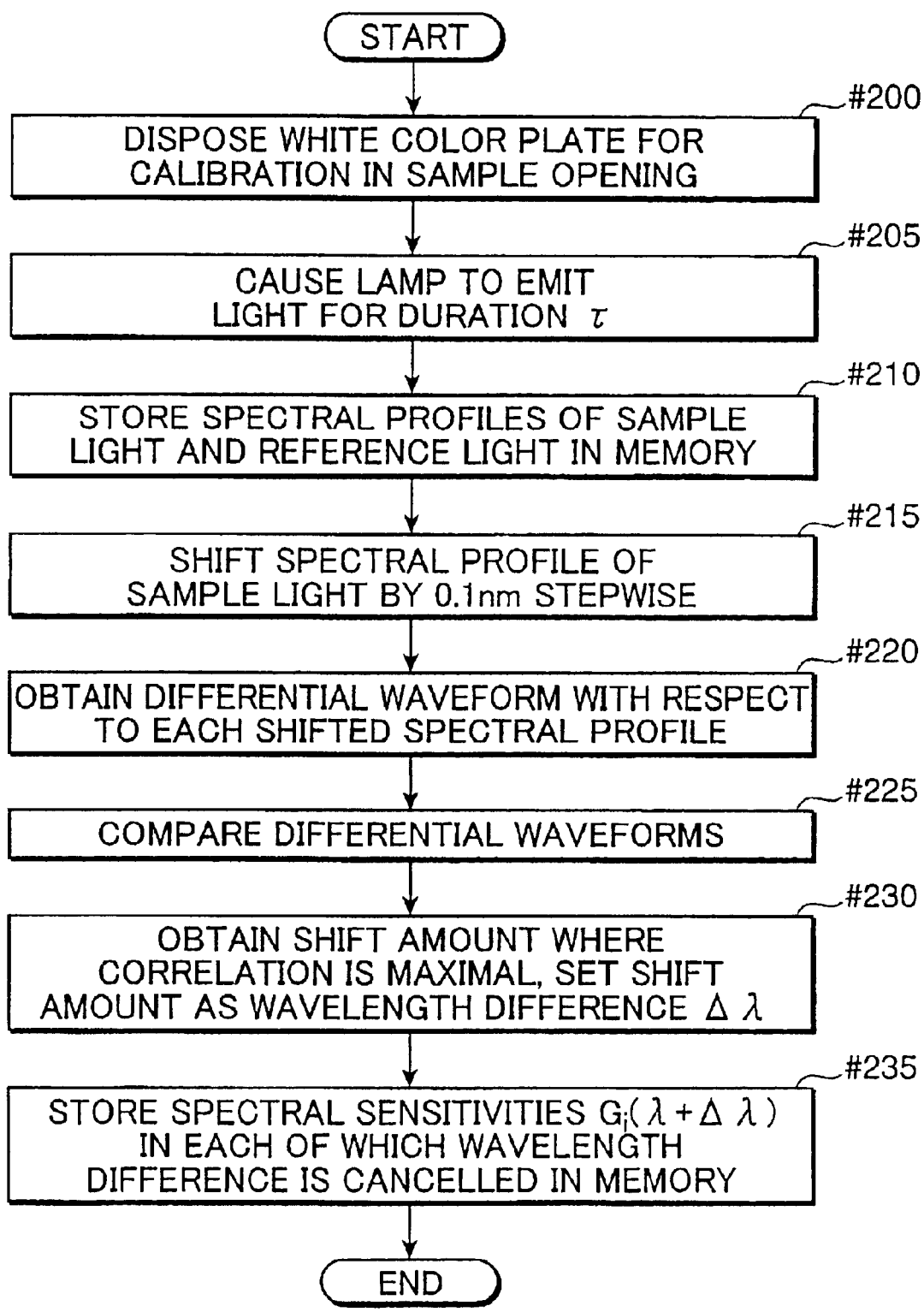

○: CENTER OF GRAVITY OF EACH SPOT REGION GENERATED FROM RAYS OF LIGHT

○: CENTER OF GRAVITY OF EACH SPOT REGION GENERATED FROM RAYS OF LIGHT BEFORE BLOCKING

●: CENTER OF GRAVITY OF EACH SPOT REGION GENERATED FROM RAYS OF LIGHT AFTER BLOCKING

SPECTRAL CHARACTERISTIC MEASURING APPARATUS AND METHOD FOR CORRECTING WAVELENGTH SHIFT OF SPECTRAL SENSITIVITY IN THE APPARATUS

This application is based on patent application Nos. 2001-212547 and 2002-142015 filed in Japan, the contents of which are hereby incorporated by references.

BACKGROUND OF THE INVENTION

1. Field of the Invention

This invention relates to a spectral characteristic measuring apparatus such as spectral calorimeters, and more particularly to technology of correcting a shift of spectral sensitivity of a light sensor in a wavelength direction (hereinafter, referred to as "wavelength shift") resulting from wearing of the apparatus with time or a change in ambient temperature around the apparatus.

2. Description of the Related Art

Generally, spectral characteristic measuring apparatus such as spectral colorimeters have amplitudes, central wavelengths, and half bandwidths of spectral sensitivities of a light sensor thereof calibrated, at the time of production thereof, with use of bright line spectra emitted from a laser or a reference color plate under a temperature control prior to shipment. However, measurement precision of the apparatus is likely to deteriorate if the spectral sensitivity of the light sensor is varied in the amplitude direction or wavelength diffusing direction after the shipment due to wearing of the apparatus with time or an ambient temperature change around the apparatus.

Generally, a light sensor has an arrangement such that a plurality of photoelectric conversion elements are arrayed at a certain interval in the wavelength diffusing direction of a spectral device so that each photoelectric conversion element receives light in a different wavelength band to output an electric signal corresponding to the received light intensity. If the light sensor is displaced relative to the spectral device in the wavelength diffusing direction due to wearing of the apparatus with time or the like, the spectral sensitivity of the light sensor may be shifted in the wavelength diffusing direction.

A shift of the spectral sensitivity of the light sensor in the amplitude direction can be corrected easily and a sufficient number of times by customarily performing white calibration with use of a white color plate for calibration each time before actual measurement, thus enabling to perform correction under environmental conditions for actual measurement.

Regarding a wavelength shift correction, according to the current state of art, it is a general practice to correct a wavelength shift of the spectral sensitivity of the light sensor by measuring spectral characteristics of a reference color sample whose spectral reflectance is known and by presumably calculating a shift amount based on a difference between the measurement result and the known data.

Many of the reference color samples, however, have large temperature dependency characteristics. Particularly, high chromatic reference color samples of colors such as red, orange and yellow which have steep spectral characteristics and thus are effective in correcting a wavelength shift have a temperature dependency characteristic such that a wavelength shift of 0.1 nm or more is generated with respect to a temperature change of 1° C.

In view of the above, in order to accurately perform correction with use of such a reference color sample, a) correction is performed at the same ambient temperature as the temperature at which the known spectral reflectance has been obtained, or b) the temperature of the reference color sample at the time of correction is measured, and a temperature correction is performed with respect to the known spectral reflectance.

In order to implement the former technique a), it is required to perform correction in a room under a strict temperature control, which raises the costs for correction. In case where the measuring apparatus is used in a site whose ambient temperature is different from the temperature at which the correction has actually been performed, there is no sense of performing such a correction. According to the latter technique b), it is required to measure a temperature dependency characteristic of a reference color sample having a certain spectral reflectance in advance and also to measure the temperature of the reference color sample at the time of correction for correction of the known data, which requires time and labor. In particular, since a portable spectral colorimeter is generally not used in a testing room but is used in a variety of environments whose ambient temperature differs, none of the above correcting methods is practical.

In addition to the above drawbacks, the conventional art requires measuring spectral characteristics of the reference color samples themselves and providing a space for storing these reference color samples. In view of the above, it is a general practice to return the apparatus to the manufacturing factory for correcting wavelength shifts of the spectral sensitivities of the apparatus, and such correction is seldom performed on the user side.

As mentioned above, wavelength shift correction of the spectral sensitivity of the spectral device is not performed on daily-basis in view of the cumbersome operations mentioned above, thus becoming one of the primary factors which hinder acquiring consistent measurement data.

SUMMARY OF THE INVENTION

It is an object of the invention to provide a spectral characteristic measuring apparatus and a method for correcting a wavelength shift of spectral sensitivity of the apparatus that is free from the problems residing in the prior art.

According to an aspect of the invention, a spectral characteristic measuring apparatus comprises an illuminator for illuminating a sample to be measured, an illuminator controller for controlling the illuminator to emit light, a light separator for separating rays of the light from the sample according to wavelengths, a light receiver outputting a spectral profile being formed by a plurality of light receiving signals, a spectral sensitivity storage unit for storing spectral sensitivities of the photoelectric conversion elements.

The apparatus is further provided with: a spectral characteristic calculator for calculating a spectral characteristic of the sample in a predetermined wavelength band for measurement with use of the spectral profile and the spectral sensitivities of the photoelectric conversion elements; a reference spectral profile group storage unit for storing a reference spectral profile group including a spectral profile in a specific wavelength band including at least a specific wavelength which is output from the light receiver when the light receiver receives light from a light source having a light intensity peak at the specific wavelength in an initial state of the apparatus, and a plurality of spectral profiles in the specific wavelength band to be output from the light receiver at each displaced position when the light receiver is displaced relative to the light separator in the wavelength diffusing direction at a certain pitch stepwise; a correction controller for controlling the light source to emit light in a calibratable state of the apparatus after the initial state thereof; and a correction amount calculator for comparing a spectral profile for correction which is output from the light receiver when the light source is caused to emit light, and each spectral profile stored in the reference spectral profile group storage unit in the specific wavelength band, and which sets a shift amount corresponding to the spectral profile which is stored in the reference spectral profile group storage unit and is most approximate to the corrective spectral profile as a wavelength shift correction amount to correct the relative displacement of the light receiver after the initial state of the apparatus.

These and other objects, features, and advantages of the present invention will become more apparent upon reading the following detailed description along with the accompanying drawings.

BRIEF DESCRIPTION OF THE DRAWINGS

FIG. 12 is a flowchart showing steps of a procedure to calibrate a central wavelength of a spectral sensitivity of each sensor of a reference light sensor array;

DETAILED DESCRIPTION OF THE PREFERRED EMBODIMENTS OF THE INVENTION

Figure 1:
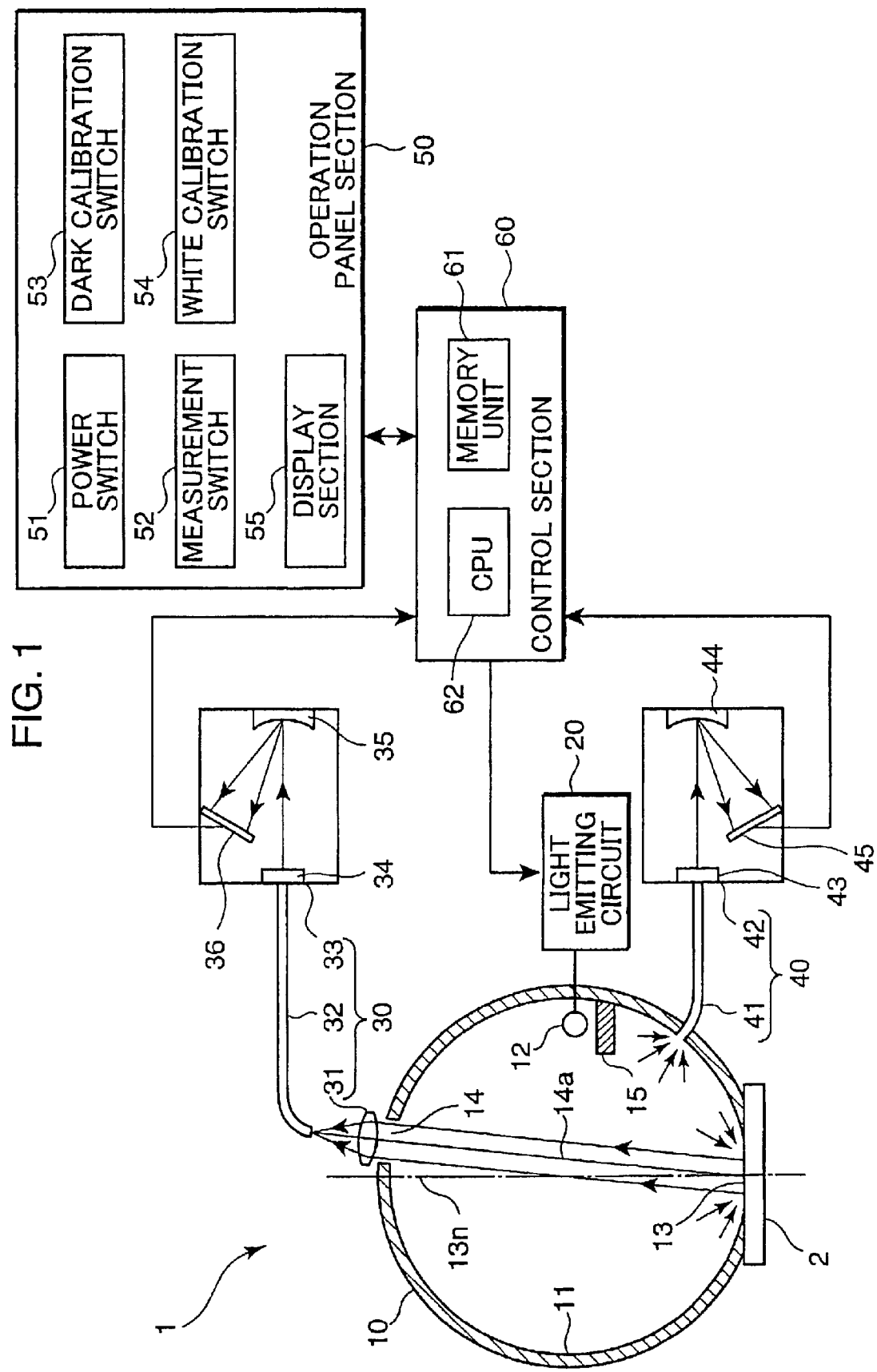
FIG. 1 is a diagram showing a schematic arrangement of a spectral colorimeter according to an embodiment of the invention.

Referring to FIG. 1 schematically showing a spectral colorimeter according to an embodiment of the invention, a spectral colorimeter 1 includes an integrating sphere 10, a light emitting circuit 20, a sample light measuring section 30, a reference light measuring section 40, an operation panel section 50, and a controlling section 60. With these parts, a spectral reflection characteristic of a sample to be measured, namely, of a sample 2, is measured.

The integrating sphere 10 is a hollow sphere whose inner wall 11 is coated with a white color diffusive and reflective paint having high diffusiveness and high reflectance such as magnesium oxide and barium sulfate. The integrating sphere 10 is internally equipped with a xenon flash lamp 12 (hereinafter, simply referred to as "lamp 12") as a light source to generate diffusive light obtained by reflecting light from the lamp 12 on the inner wall 11 by multiple reflections.

FIG. 1 is a sectional side view of the integrating sphere 10. The integrating sphere 10 includes a sample opening 13 which is formed in a lower end portion of the integrating sphere 10 to place the sample 2, and a light receiving opening 14 which is formed in a position angularly displaced from a normal line 13n to the sample opening 13 by 8 degrees to receive light from the sample 2. As shown in FIG. 1, the integrating sphere 10 has a light blocking piece 15 below the lamp 12 to keep the light from the lamp 12 from directly irradiating the region of the sample opening 13.

Figure 2:
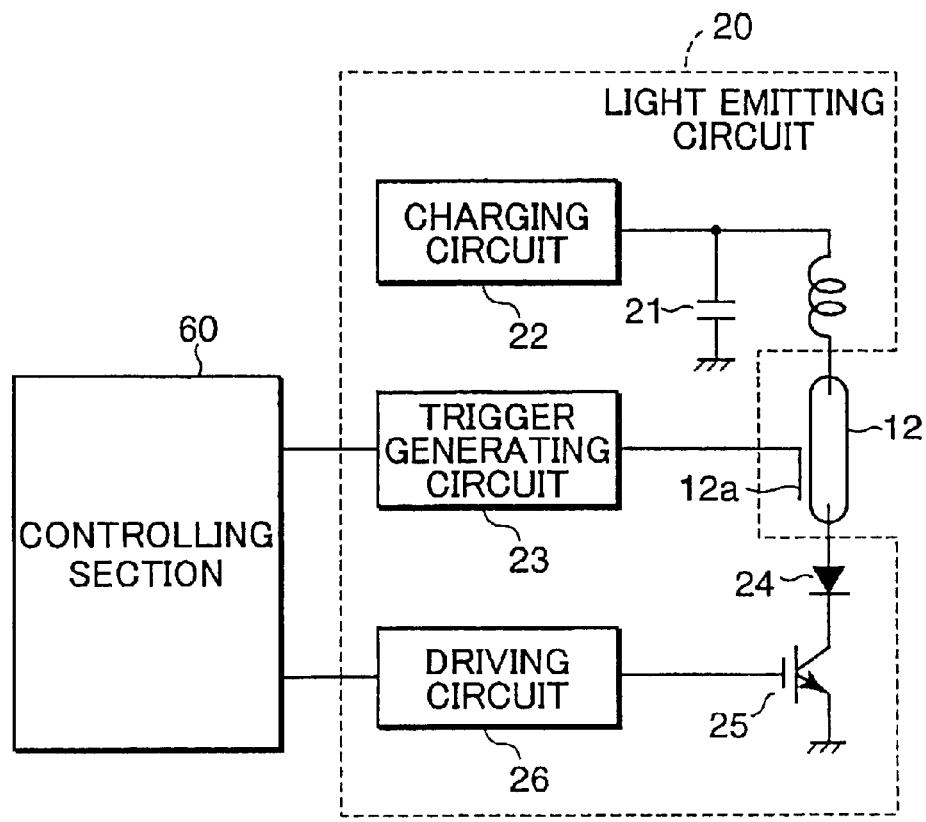
FIG. 2 is a diagram showing an electrical configuration of a light emitting circuit of the spectral colorimeter.

The light emitting circuit 20 is adapted to cause the lamp 12 to emit light. As shown in FIG. 2, the light emitting circuit 20 includes a main capacitor 21 for applying such a high DC voltage as several hundred volts to an electrode of the lamp 12, a charging circuit 22 for charging the main capacitor 21, a trigger generating circuit 23 for applying such a high AC voltage as several tens of thousand volts to a trigger electrode 12a composed of a metallic wire tightly wound around the lamp 12, a diode 24, a semiconductor switching element 25 including e.g. IGBT, and a driving circuit 26 for applying a drive voltage to the semiconductor switching element 25.

With this arrangement, when a trigger capacitor in the trigger generating circuit 23 is allowed to apply a high AC voltage instantaneously to the trigger electrode 12a via a trigger transformer while applying a high DC voltage to the opposite electrodes of the lamp 12 in an ON-state of the semiconductor switching element 25, the lamp 12 is triggered to allow a direct current to flow from the main capacitor 21 for emission. The duration of the emission of the lamp 12 is regulated by controlling the timing of turning the semiconductor switching element 25 off after initiation of the emission of the lamp 12.

The sample light measuring section 30 includes a light sensing optical unit 31, an optical fiber 32, and a sample light separator 33. The light sensing optical unit 31 is disposed near the light receiving opening 14 of the integrating sphere 10 to gather light reflected from the sample 2 which is disposed in the sample opening 13 and is subjected to diffusive illumination (hereinafter, referred to as "sample light") as a light component 14a directed in a direction displaced from the normal line 13n by 8 degrees for focusing the light component 14a in a light incident port of the optical fiber 32. The light image of the reflected light from the sample 2 is then guided to the sample light separator 33 through the optical fiber 32.

The sample light separator 33 includes an infrared ray blocking filter 34, a grating member 35, and a sample light sensor array 36. The infrared ray blocking filter 34 is disposed near a light emerging port of the optical fiber 32 and is adapted to block light of a wavelength of e.g., 800 nm or longer. The grating member 35 is adapted to separate the sample light that is incident on the grating member 35 through the infrared ray blocking filter 34 according to wavelength bands for reflection. In this embodiment, a reflective concave grating member is used as the element 35. Alternatively, a transmissive grating member may be used.

The sample light sensor array 36 includes a plurality of photoelectric conversion elements arrayed in the order of wavelength bands separated by the grating member 35. Each photoelectric conversion element is adapted to receive light in a different wavelength band to output an electric signal corresponding to an intensity of the received light. The detailed arrangement of the sample light sensor array 36 is described later.

The integrating sphere 10 and the sample light measuring section 30 constitute the spectral colorimeter 1 of the type d/8 in geometric configuration.

The reference light measuring section 40 includes an optical fiber 41 and a reference light separator 42. A light incident port of the optical fiber 41 is arranged at an appropriate position of the integrating sphere 10, for instance, at a location where light from the lamp 12 and the sample light do not directly reach, to allow diffusive light in the integrating sphere 10 to be guided to the reference light separator 42 as reference light through the optical fiber 41.

The reference light separator 42 has an arrangement similar to the sample light separator 33. Specifically, the reference light separator 42 includes an infrared ray blocking filter 43 for blocking light in a wavelength of, e.g., 800 nm or longer, a concave grating member 44 for separating the reference light incident thereon through the infrared ray blocking filter 43 according to the order of wavelength bands for reflection, and a reference light sensor array 45 having a plurality of photoelectric conversion elements arrayed in the order of the wavelength bands separated by the concave grating member 44. In this embodiment, a concave grating member is used as the element 44. Alternatively, a transmissive grating member may be used.

The operation panel section 50 is provided on a top surface of a main body of the colorimeter 1, and includes a power switch 51, a measurement switch 52, a dark calibration switch 53, a white calibration switch 54, and a display unit 55 having an LCD for displaying measurement results, etc. thereon.

The controlling section 60 includes a memory unit 61, a CPU 62, an A/D converter, and other electronic circuits to control overall operations of the spectral colorimeter 1.

Figure 3:
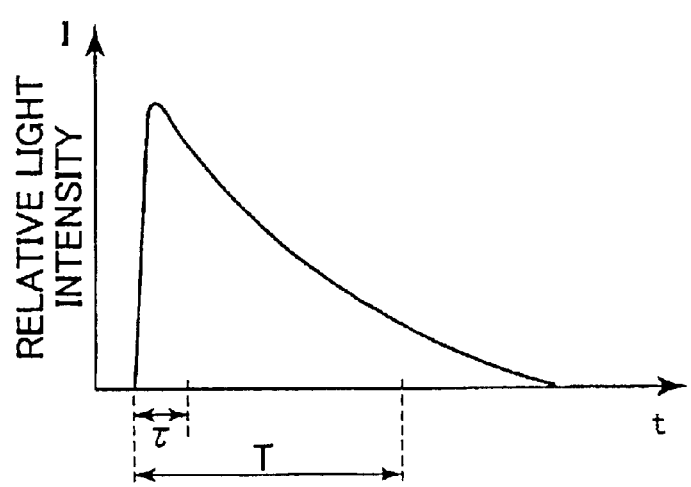
FIG. 3 is a diagram showing a relationship between relative emission intensity and emission duration of a xenon flash lamp.

The memory unit 61 includes an ROM or an EEPROM storing a reference spectral profile obtained in advance which is described later, a control program, etc., as well as a rewritable memory such as an RAM for temporarily storing data. The CPU 62 is operable according to the control program stored in the memory unit 61, and has the following functions. The detailed operations of the CPU are described later.

a) Function of outputting a control signal to the light emitting circuit 20 for controlling emission of the lamp 12 when the measurement switch 52, the dark calibration switch 53, and the white calibration switch 54 on the operation panel section 50 are depressed. It should be appreciated that the duration of emission of the lamp 12 is set such that a predetermined time $\tau$ (in this embodiment, e.g., $\tau=40$ $\mu$s) is allocated as the emission duration for obtaining a reference spectral profile or correcting a wavelength shift, and a predetermined time T (T>$\tau$, in this embodiment, e.g., T=200 $\mu$s) is allocated as the emission duration for performing dark calibration, white calibration, or measuring a spectral characteristic of a sample. FIG. 3 is a graph showing a change of relative light intensity with time after the lamp 12 is caused to emit light. As shown in FIG. 3, although the relative light intensity at the time upon lapse of the predetermined time $\tau$ has already passed the peak point, it is clear that sufficient light intensity is secured at the time even after the lapse of the predetermined time $\tau$.

b) Spectral characteristic calculating function of obtaining spectral reflectances of the sample 2 placed in the sample opening 13 based on spectral intensity signals output from the sensor arrays 36, 45.

c) Correction amount calculating function of obtaining a correction amount to correct wavelength shifts of spectral sensitivities of the sample light sensor array 36.

d) Alert control function of discriminating whether the obtained correction amount has exceeded a predetermined value, and alerting a user that the obtained correction amount has exceeded the predetermined value through the display unit 55 in the case where it is judged that the obtained correction amount has exceeded the predetermined value.

e) Display control function of displaying measurement results on the display unit 55. In the spectral colorimeter 1 having the above arrangement, when the optical arrangement of the grating member 35 to the sample light sensor array 36 is displaced due to wearing of the colorimeter 1 with time or an ambient temperature change, thereby causing displacements of the sample light sensor array 36 to a spectral image of the sample light that has been formed by reflection on the grating member 35, the spectral sensitivities of the sample light sensor array 36 may be shifted in the wavelength diffusing direction. In view of the above, in the spectral calorimeter 1 according to this embodiment, a shift amount is obtained when performing white calibration, and the correction is carried out based on the obtained shift amount.

The design specifications of the spectral colorimeter 1 according to the embodiment are as follows. The spectral colorimeter 1 is adapted to measure spectral reflection characteristics of a sample to be measured, namely, of the sample 2, in wavelength bands from 380 nm to 780 nm with each wavelength band differentiated at the pitch of 10 nm. The sample light sensor array 36 includes forty-one photoelectric conversion elements (hereinafter, referred to as "sensors").

In this embodiment, each sensor and each wavelength band light in which the target sensor is supposed to sense are specified based on the sensor number i which is allocated to each sensor of the sample light sensor array 36 and the wavelength band number j corresponding to each sensor having the sensor number i.

Namely, the sample light sensor array 36 includes forty-one sensors having the sensor number i=0 through the sensor number i=40. The measurable wavelength bands are forty-one bands from the wavelength band number j=0 through the wavelength band number j=40 with each wavelength band differentiated at the pitch of 10 nm. Specifically, when a wavelength of the wavelength band number j is represented as $\lambda_j$, $\lambda_j$ is differentiated at the pitch of 10 nm, and $\lambda_0$=380 nm, $\lambda_{40}$=780 nm, respectively for instance.

Figure 4:
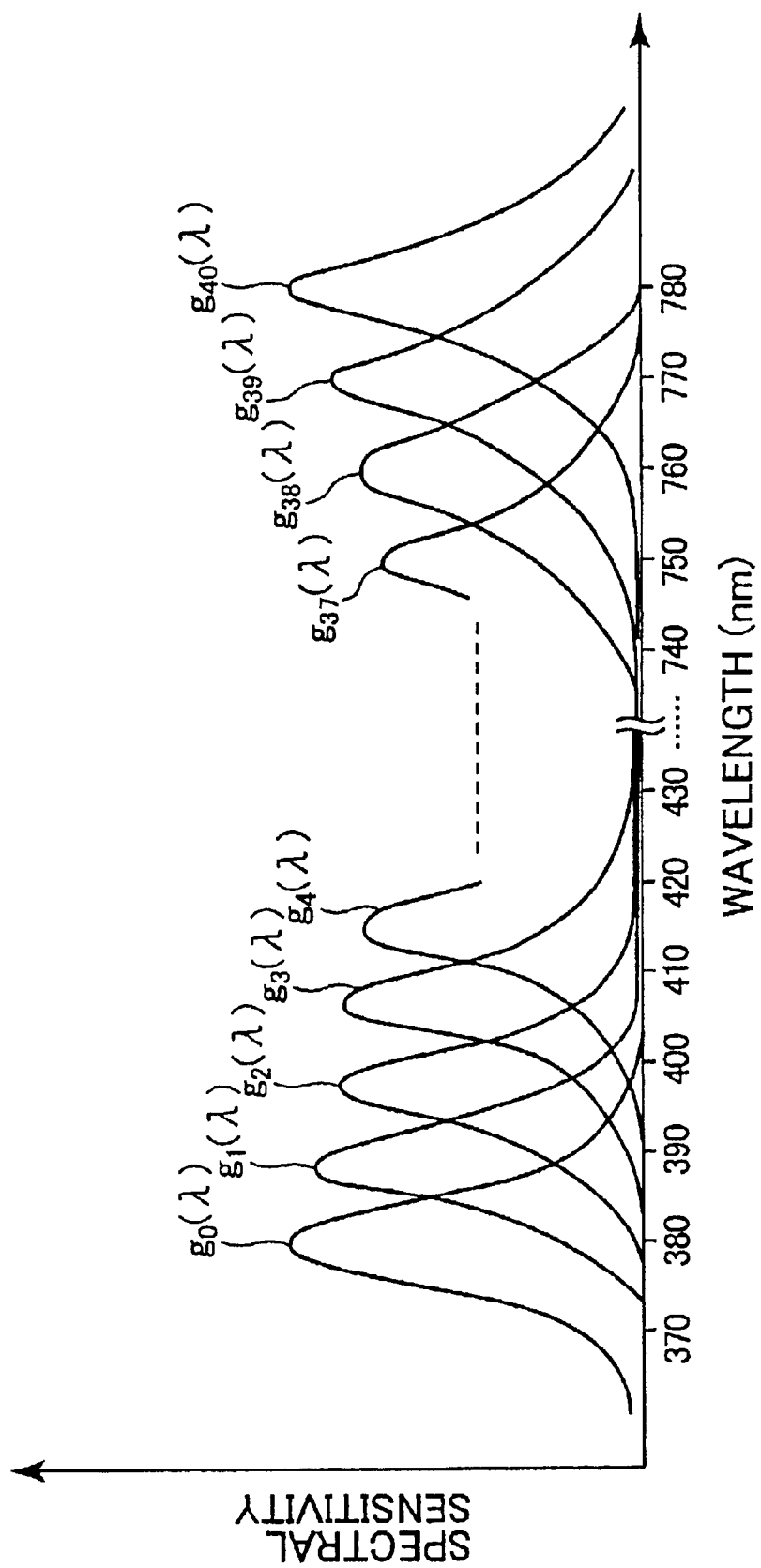
FIG. 4 is a diagram showing distributions of spectral sensitivities of a sensor array.

Next, described is a manner as to how spectral sensitivities of each sample light sensor array 36 are calibrated in the factory at the time of manufacturing the spectral colorimeters 1. FIG. 4 shows distributions of spectral sensitivities of the sample light sensor array 36.

Generally, amplitudes of spectral sensitivities of sensors constituting the sample light sensor array 36 are not identical to each other due to variation of production process of the sensors. Further, light diffusing at the pitch of 10 nm do not accurately focus on each sensor at equidistance because it is difficult to arrange the grating member 35 and the sample light sensor array 36 at respective desired positions precisely.

In this embodiment, as shown in FIG. 4, the amplitude and the half bandwidth of the spectral sensitivity $g_i(\lambda)$ of each sensor having the sensor number i are varied with respect to each sensor, and the central wavelengths of the respective spectral sensitivities do not necessarily fall in the corresponding wavelength band.

In view of the above, according to this embodiment, it is a general practice to calibrate the amplitude (sensitivity) and the central wavelength of the spectral sensitivity of each sensor in the factory at the time of manufacturing the spectral colorimeters 1 according to the following known procedure similar to the procedure implemented with respect to the conventional spectral calorimeters.

First, the spectral sensitivities $g_i(\lambda)$ of the sensors each having the sensor number i are measured according to a known procedure. For instance, a constant output monochromer is disposed in the sample opening 13 of the integrating sphere 10. Rays of monochromatic light whose wavelengths are varied, e.g., by 1 nm are allowed to emerge from the monochromer disposed in the sample opening 13 toward the light receiving opening 14. With this arrangement, the spectral sensitivities $g_i(\lambda)$ of the sensors each having the sensor number i as shown in FIG. 4 are obtained based on electric signals corresponding to received light intensities output from the sensors of the sample light sensor array 36.

Next, in this embodiment, a Gaussian function $G_i(\lambda)$ which is set based on a central wavelength $\lambda_c$ and a half bandwidth d$\lambda$ of each spectral sensitivity $g_i(\lambda)$, which are the measured values is set as a spectral sensitivity $G_i(\lambda)$ of the sensor having the sensor number i. With this arrangement, correction of a wavelength shift to be described later can be performed easily. It should be appreciated that the spectral sensitivities $g_i(\lambda)$ of the sensors each having the sensor number i that are obtained according to the above known procedure are also stored in the memory unit 61.

Figure 5:
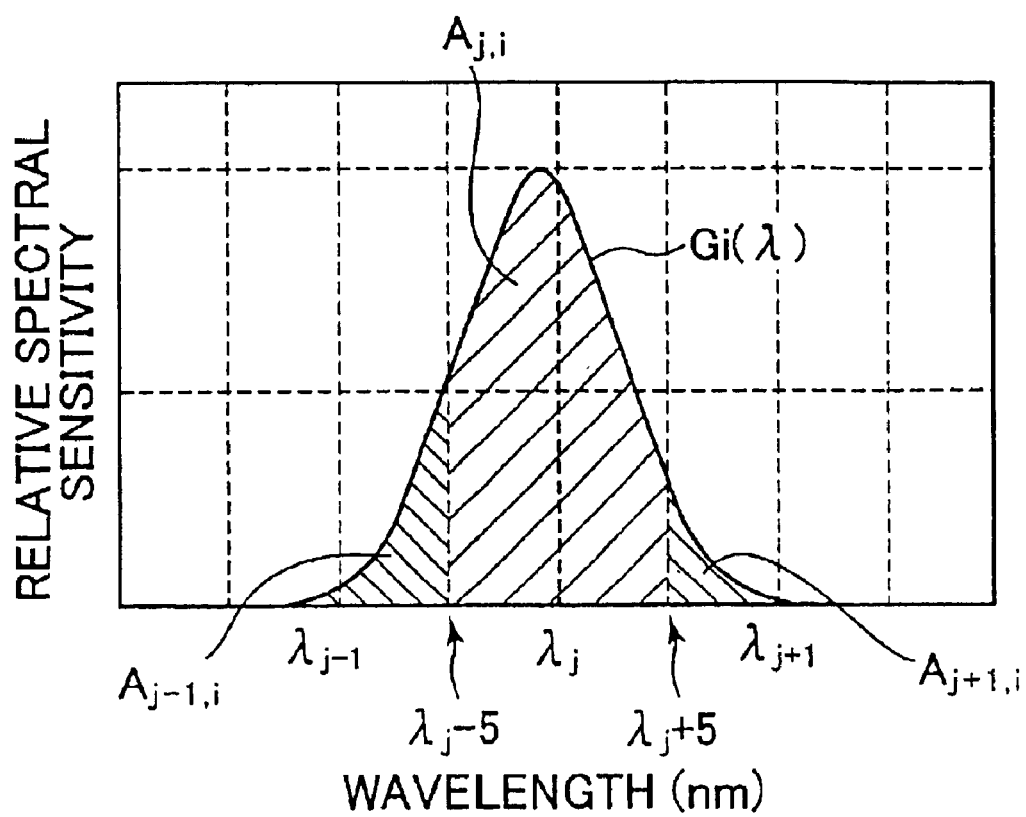
FIG. 5 is a diagram showing spectral sensitivity $G_i(\lambda)$ of a sensor having the sensor number i.

FIG. 5 shows the spectral sensitivity $G_i(\lambda)$ of the sensor having the sensor number i. In the case where incident light having spectral characteristics $P_j$ is measured with the spectral colorimeter 1, a spectral profile $O_i$ of the sensor having the sensor number i is defined as Equation (1) where $A_{j,i}$ is matrix in which the spectral sensitivity of the sensor having the sensor number i is represented in terms of a spectral sensitivity with respect to the corresponding wavelength band number j.

$$O_i = A_{j,i} \cdot P_j \quad (1)$$

In other words, the spectral characteristics $P_j$ are defined as Equation (2) in which $A_{j,i}^{-1}$ is inverse matrix to matrix $A_{j,i}$.

$$P_j = A_{j,i}^{-1} \cdot O_i \quad (2)$$

As mentioned above, the central wavelength of the sensor having the sensor number i does not generally coincide with the wavelength $\lambda_j$ where the wavelength band number j=i. Although the actually obtained measured values are the values corresponding to the output signals from the sensors, in this embodiment, data with respect to each sensor number i is converted to data with respect to the corresponding wavelength band number j by using the transformation matrix $A_{j,i}^{-1}$ to thereby obtain data with respect to the wavelength bands each differentiated at the pitch of 10 nm.

Let it be assumed that, in FIG. 4, the central wavelength of the spectral sensitivity $g_2(\lambda)$ is shifted to a shorter wavelength than what is supposed to be. Then, the shift is cancelled by shifting part of the spectral sensitivity $g_1(\lambda)$ corresponding to what is supposed to constitute part of the spectral sensitivity $g_2(\lambda)$ without the shift to the spectral sensitivity $g_2(\lambda)$ and by shifting part of the spectral sensitivity $g_2(\lambda)$ corresponding to what is supposed to constitute part of the spectral sensitivity $g_3(\lambda)$ without the shift to the spectral sensitivity $g_3(\lambda)$. In other words, the respective elements of the transformation matrix $A_{j,i}^{-1}$ serve as weight for implementing the above process.

The matrix $A_{j,i}$ is, as shown in FIG. 5, obtained by integrating the spectral sensitivities $G_i(\lambda)$ at the pitch of 10 nm, namely, by implementing Equation (3).

$$A_{j,i} = \int G_i(\lambda) d\lambda \quad (3)$$

where $\lambda$ ranges from $(\lambda_j - 5)$nm to $(\lambda_j + 5)$nm. Since each wavelength band is differentiated stepwise at the pitch of 10 nm, in FIG. 4, $\lambda_{j+1} - \lambda_j = \lambda_j - \lambda_{j-1} = 10$ nm, and $(\lambda_j + 5) = (\lambda_{j+1} - 5)$, and $(\lambda_j - 5) = (\lambda_{j-1} + 5)$, respectively.

Inverse matrix $A_{j,i}^{-1}$ to the matrix $A_{j,i}$ is stored in the memory unit 61. With this arrangement, spectral characteristics of incident light on the sample light sensor array 36 with respect to the wavelength bands differentiated at the pitch of 10 nm stepwise can be obtained according to Equation (2).

The calibration process of the sensitivities and the central wavelengths of the sensors of the sample light sensor array 36 is not limited to the above embodiment. Other known processes such as the process in Japanese Examined Patent Publication No. 8-27215 are applicable.

Figure 6:
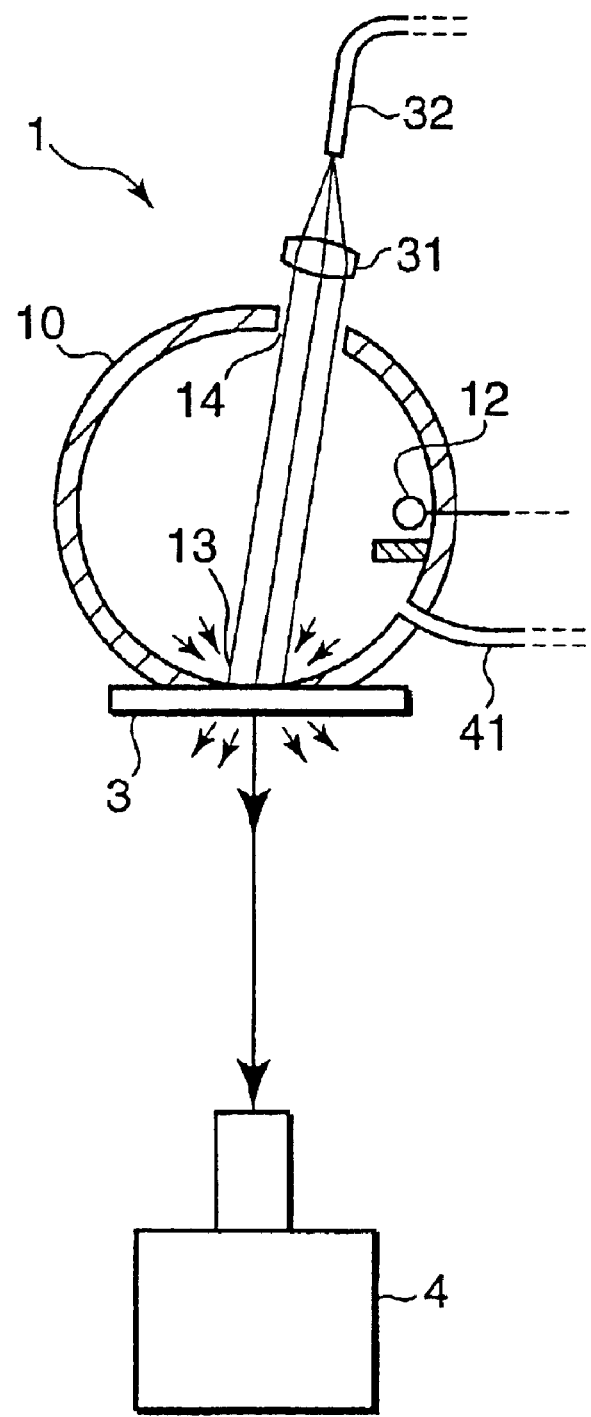
FIG. 6 is a diagram showing an arrangement as to how a spectral intensity of a lamp is measured with a spectral luminance meter.
Figure 7:
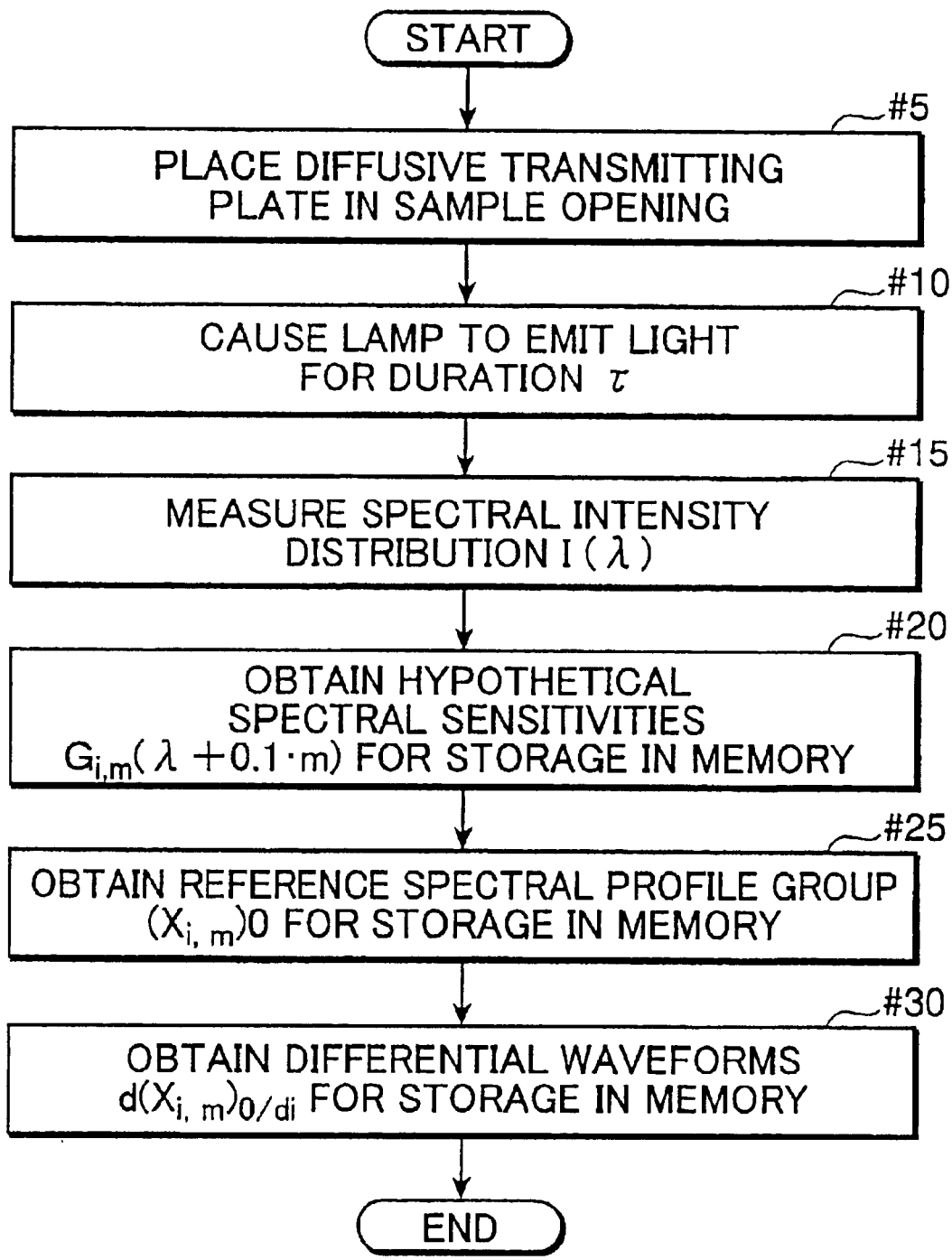
FIG. 7 is a flowchart showing steps of a procedure to obtain a reference spectral profile group.

Next, steps for obtaining a reference spectral profile group used in "Wavelength shift Correction" which is described later are described with reference to FIGS. 6 and 7. FIG. 6 shows an exemplified arrangement for measuring a spectral intensity distribution of the lamp 12. FIG. 7 shows steps of a procedure to obtain a reference spectral profile. A reference spectral profile group is obtained in the factory at the time of manufacturing the spectral colorimeters 1, and are stored in the memory units 61 of the respective spectral calorimeters 1.

First, referring to FIG. 7, a light diffusive transmissive plate 3 is disposed in the sample opening 13 of the integrating sphere 10 of the spectral colorimeter 1 for which the reference spectral profile is to be obtained in Step #5 (see FIG. 6). In this state, the lamp 12 is caused to emit light for a predetermined duration τ (Step #10), and a spectral intensity distribution I(λ) of the lamp 12 is measured by a spectral luminance meter whose wavelength resolution is about 1 nm (Step #15).

Subsequently, hypothetical spectral sensitivities $G_{i,m}$ (λ+0.1·m) are obtained by shifting the spectral sensitivities $G_i(λ)$ of the sample light sensor array 36 that have been obtained by the aforementioned Calibration of Spectral Sensitivity and stored in the memory unit 61 by 0.1 nm stepwise within the range of ±1 nm, where m is an integer from −10 to +10 (Step #20).

A spectral profile group $(X_{i,m})_0$ which is the values obtained by observing the spectral intensity I(λ) in terms of the spectral sensitivities $G_{i,m}$ (λ+0.1·m) are calculated according to Equation (4), and the thus obtained spectral profile group $(X_{i,m})_0$ is stored as a reference spectral profile group $(X_{i,m})_0$ in the memory unit 61 (Step #25).

$$(X_{i,m})_0 = \int G_{i,m}(λ+0.1·m)·I(λ)dλ \tag{4}$$

where m is an integer from −10 to +10.

Next, differences $d(X_{i,m})_0/di$ of the reference spectral profile group $(X_{i,m})_0$ are calculated for storage in the memory unit 61 (Step #30).

Next, dark calibration, white calibration, sample light measurement, and wavelength shift correction to be implemented by a user with respect to the spectral calorimeter 1 are described. Dark calibration is performed when the dark calibration switch 53 is depressed. White calibration and wavelength shift correction are performed when the white calibration switch 54 is depressed. The dark calibration and the white calibration are performed periodically (e.g., once a day) or each time measurement is performed. The dark calibration and the white calibration are known art implemented conventionally.

In the nature, there exist dark currents of photoelectric conversion elements, and stray light other than light to be measured with respect to a sample. Accordingly, even if a reflectance of a sample having a reflectance of 0% is measured with a calorimeter, an offset current of an insignificant level is output with the result that the measured reflectance does not show 0%. Such stray light includes light that is irradiated from a light source for irradiating the sample but directly reaches the photoelectric conversion elements, and scattered light from an optical system such as a lens.

In order to remove redundant output due to dark current, stray light and the like, in this embodiment, dark calibration is performed prior to measuring a reflection characteristic, and the measurement result of the dark calibration is stored in the memory unit 61 as a dark calibration value. Further, in computations such as wavelength shift correction and sample light measurement which require a spectral profile group output from the sensor arrays 36, 45, the dark calibration value is reduced from the corresponding spectral profile as an offset value.

Next, steps of a procedure to perform dark calibration in this embodiment are described. When the dark calibration switch 53 is depressed in a state a) there is no element disposed in the sample opening 13 of the integrating sphere 10, or b) a light trapping unit (not shown) having an inner wall coated with black color paint and so constructed as to keep illumination light reflected from the inner wall from directly returning to the inside of the integrating sphere 10 is disposed in the sample opening 13, the lamp 12 is allowed to emit light for a predetermined duration T (T=200 μs in this embodiment). Then, the spectral profile group corresponding to the sample light and the reference light is output from the sensor arrays 36, 45, respectively.

Subsequently, sample light spectral intensities $(S_d)_j$ and reference light spectral intensities $(R_d)_j$ whose wavelength bands are differentiated stepwise at the pitch of 10 nm are obtained according to Equation (2). Then, dark calibration values $d_j$ are calculated according to Equation (5) for storage in the memory unit 61.

$$d_j = (S_d)_j/(R_d)_j \tag{5}$$

where j is a wavelength band number.

In this way, performing the dark calibration enables to properly remove an adverse effect caused by variation of stray light amount due to wearing of the lamp 12 with time or external disturbance, even if such a phenomenon occurs. This arrangement is advantageous in preventing generation of measurement error.

White calibration is performed in a state that a white color plate for calibration is disposed in the sample opening 13 in FIG. 1 as the sample 2. The white color plate is a plate having a white color surface whose spectral reflectances $W_j$ at the pitch of 10 nm are known, e.g., a plate having a white color surface as listed in Paragraph 4.3.4 of JIS Z 8722 "Method for measuring color—reflective and transmissive color of object".

When the white calibration switch 54 is depressed in a state that the white color plate is disposed in the sample opening 13 as the sample 2, the lamp 12 is caused to emit light for a predetermined duration T (T=200 μs in this embodiment). Then, the spectral profile group corresponding to the sample light and the reference light is output from the sensor arrays 36, 45, respectively.

Subsequently, sample light spectral intensities $(S_w)_j$ and reference light spectral intensities $(R_w)_j$ whose wavelength bands are differentiated stepwise at the pitch of 10 nm are obtained according to Equation (2).

Then, white calibration coefficients $C_j$ are calculated according to Equation (6) for storage in the memory unit 61.

$$C_j = W_j/[(S_w)_j/(R_w)_j - d_j] \tag{6}$$

Performing the white calibration in the above manner enables to properly remove an adverse effect caused by variation of the sensitivities of the sensor arrays 36, 45 due to wearing of the sensors with time or environmental change, even if such a phenomenon occurs. This arrangement is advantageous in preventing generation of measurement error.

Spectral reflectances $r_j$ of a sample to be measured as the sample 2 are obtained by substituting the sample light spectral intensities $S_j$ and the reference light spectral intensities $R_j$ that have been obtained with respect to the wavelength bands differentiated at the pitch of 10 nm stepwise by implementing the computation according to Equation (2) with use of the spectral profile group respectively output from the sensor arrays 36, 45 in correspondence to the sample light and the reference light, and the dark calibration values $d_j$ and the white calibration coefficients $C_j$ in Equation (7)

$$r_j = C_j·(S_j/R_j - d_j) \tag{7}$$

Figure 8:
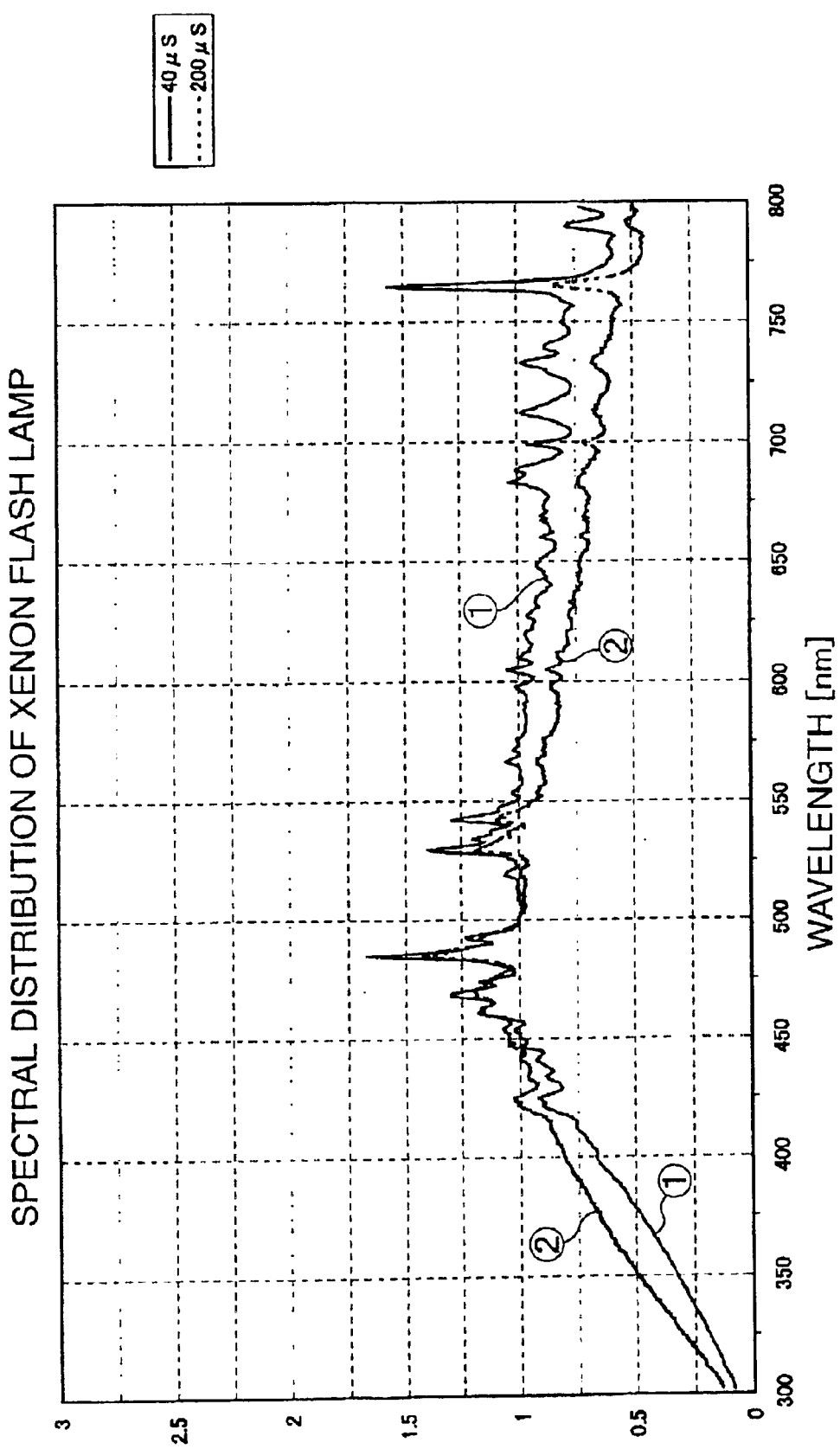
FIG. 8 is a graph showing emission spectral distributions of a xenon flash lamp.

Next, a wavelength shift correction is described with reference to FIGS. 8 through 11. FIG. 8 shows an emission spectral distribution of the xenon flash lamp 12 in which the distribution ① is obtained when the light emission duration of the lamp 12 is 40 μs, and the distribution ② is obtained when the light emission duration of the lamp 12 is 200 μs.

Emission spectra of a xenon flash lamp consist of bright line spectra and continuous spectra. The bright line spectra are derived from the energy level of atom, and exhibit high wavelength stability.

As shown in FIG. 8, the bright line spectra show greater intensity than the continuous spectra in the case where the emission duration is 40 μs as compared with the case where the emission duration is 200 μs. In view of the above, although generally, spectral characteristics are measured by setting the emission duration at about 200 μs, in this embodiment, the emission duration at the time of the wavelength shift correction is set at about 40 μs.

Further, as shown in the distribution ① in FIG. 8, there are found several bright line spectra having exceedingly greater intensity than the continuous spectra in a wavelength band including the wavelength 700 nm or longer. Specifically, there is found a bright line spectrum just around the wavelength 764 nm having a particularly large intensity compared to the other bright line spectra in the same wavelength band. In this embodiment, wavelength shift correction is performed with use of the bright line spectrum just around the wavelength 764 nm.

The xenon flash lamp 12 has bright line spectra showing large intensity in a wavelength band including the wavelength 800 nm or longer (not shown). However, wavelength components of 800 nm or longer are removed because, in this embodiment, the infrared ray blocking filters 34, 43 (see FIG. 1) are disposed in the light incident ports of the sample light separator 33 and the reference light separator 42, respectively. With this arrangement, there is no likelihood that the measurement is adversely affected by the bright line spectra in the wavelength band including the wavelength 800 nm or longer.

Figure 9:
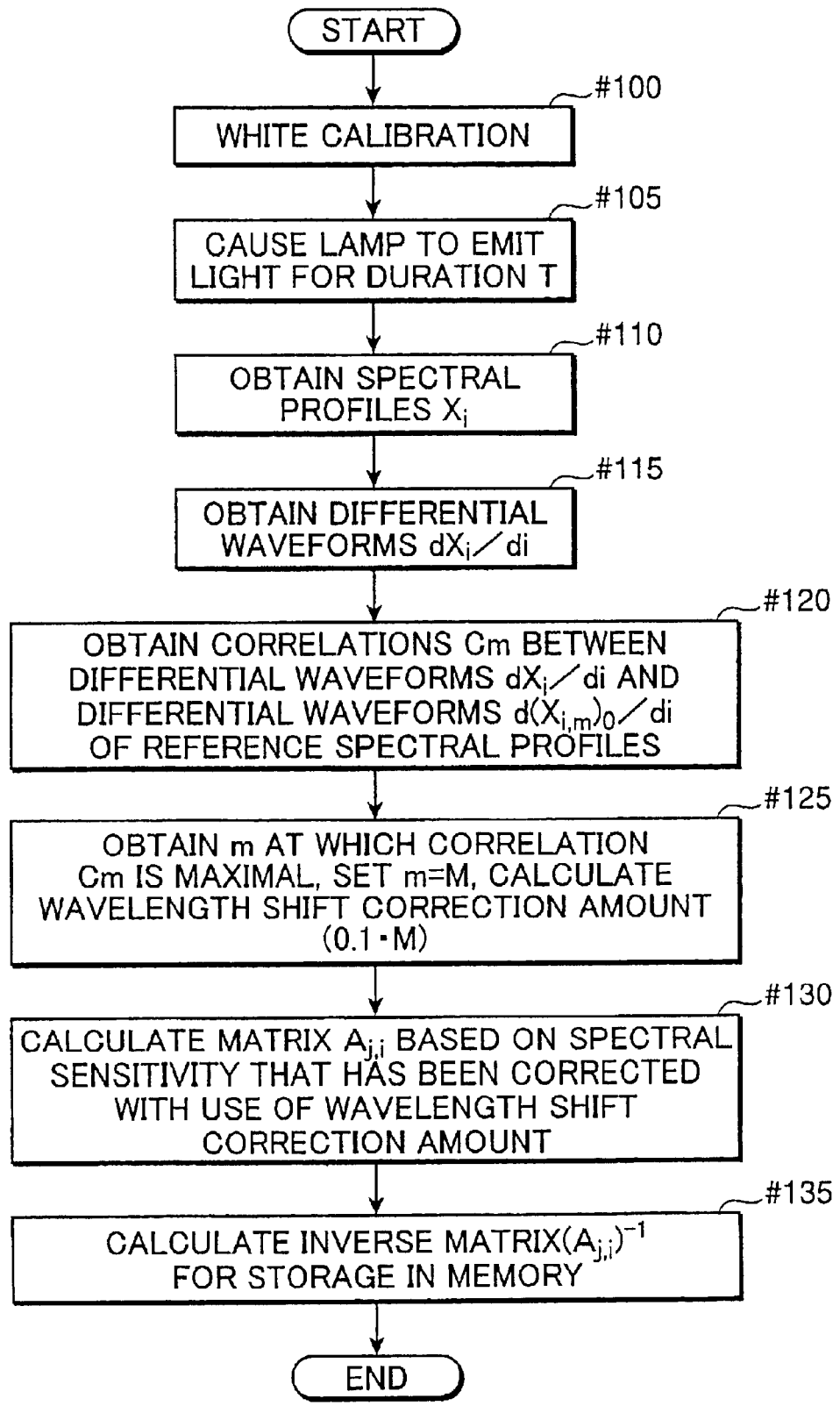
FIG. 9 is a flowchart showing steps of a procedure to perform a wavelength shift correction.
Figure 10A:
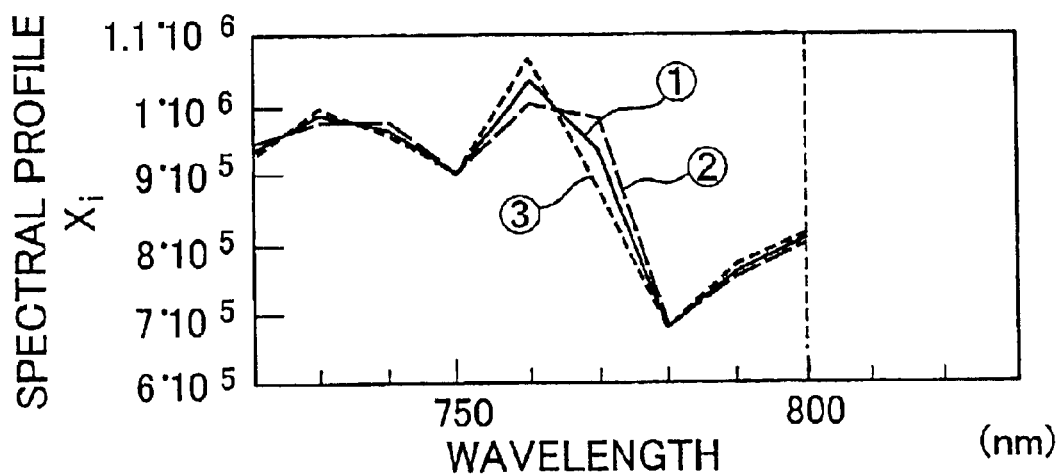
FIG. 10A is a graph showing an exemplified spectral profile $X_i$ in a wavelength band including the wavelength 764 nm.

FIG. 9 is a flowchart showing the steps of a procedure for performing the wavelength shift correction. FIG. 10A shows waveforms corresponding to an exemplified spectral profile $X_i$ in the wavelength band including the wavelength 764 nm, and FIG. 10B shows differential waveforms corresponding to the waveforms in FIG. 10A.

In FIG. 9, the white calibration is started when the color calibration switch 54 is depressed (Step #100). When the color calibration switch 54 is depressed, the lamp 12 is caused to emit light for a predetermined duration τ (τ=40 μs in this embodiment) in a state that the white color plate for calibration is disposed in the sample opening 13 (Step #105). The spectral profile $X_i$ of the sensors each having the sensor number i (e.g., i=34 to 40) that are arrayed in the wavelength band whose central wavelength is near the wavelength 764 nm is calculated (Step #110) to obtain the respective corresponding differential waveforms $dX_i/di$ (Step #115).

Figure 10B:
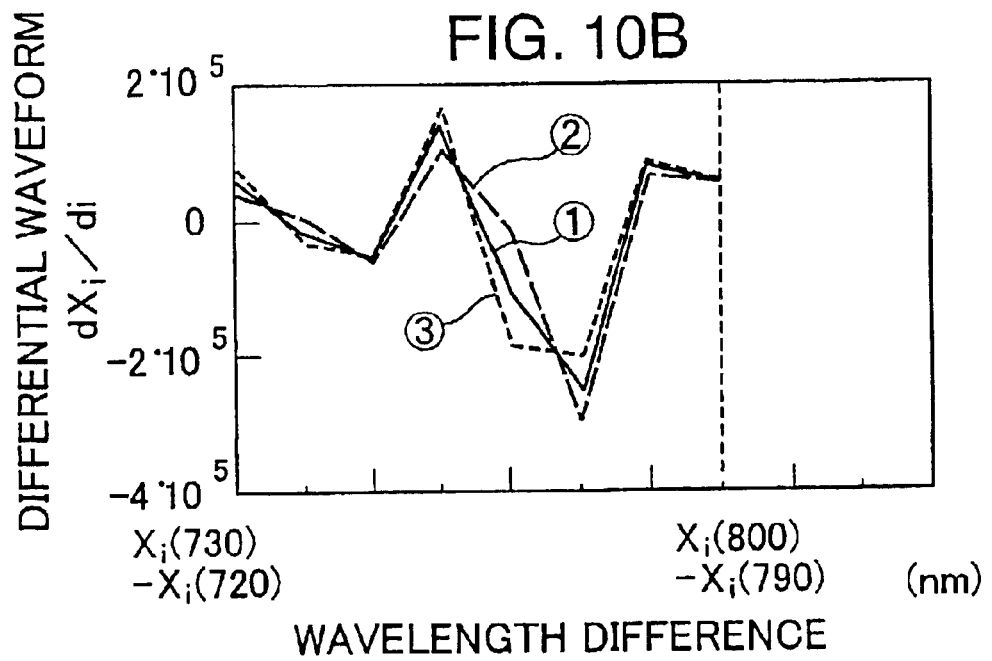
FIG. 10B is a graph showing differential waveforms corresponding to the spectral profile shown in FIG. 10A.

In FIG. 10A, an exemplified spectral profile $X_i$ in the wavelength band from 720 nm to 800 nm is represented as the waveform ① shown by the solid line, whereas in FIG. 10B, the differential waveform $dX_i/di$ corresponding to differential values $[X_i(730)-X_i(720)]$ to $[X_i(800)-X_i(790)]$ is represented as the waveform ① shown by the solid line.

Referring back to FIG. 9, correlations $C_m$ between the thus calculated differential waveforms $dX_i/di$ and the differential waveforms $d(X_{i,m})_0/di$ of the reference spectral profile group $(X_{i,m})_0$ stored in the memory unit 61 with respect to each sensor having the sensor number i (e.g., i=34 to 40) whose central wavelength lies near the wavelength 764 nm is calculated according to Equation (8) (Step #120).

$$C_m = [\Sigma(dX_i/di) \cdot \{d(X_{i,m})_0/di\}]^2 / [\Sigma(dX_i/di)^2 \cdot \Sigma\{d(X_{i,m})_0/di\}^2] \quad (8)$$

where m is an integer from −10 to +10.

The value m at which the correlation $C_m$ is maximal is obtained to set m=M, and the value (0.1·M) is set as a wavelength shift correction amount (Step #125).

Subsequently, the spectral sensitivities $G_i(\lambda)$ of the sensors each having the sensor number i that are stored in the memory unit 61 are transformed to corrective spectral sensitivities $G_i(\lambda+0.1\cdot M)$ based on the wavelength shift correction amount (0.1·M), and matrix $A_{j,i}'$ is obtained by substituting the corrective spectral sensitivities $G_i(\lambda+0.1\cdot M)$ in Equation (9) (Step #130)

$$A_{j,i}' = \int G_i(\lambda+0.1\cdot M) d\lambda \quad (9)$$

where dλ is $(\lambda_j-5)$nm to $(\lambda_j+5)$nm.

Then, inverse matrix $(A_{j,i}')^{-1}$ to matrix $A_{j,i}'$ is obtained for storage in the memory unit 61 (Step #135).

In the sample light measurement that follows the above steps, the spectral sensitivities $P_j$ of the sample to be measured are obtained by substituting the matrix $(A_{j,i}')^{-1}$ in Equation (2) in place of the matrix $A_{j,i}^{-1}$.

In the above embodiment, since the correlations are obtained by using the differential waveforms of the spectral profiles, an affect by continuous spectra can be cancelled. Thereby, even if intensities of the bright line spectra to the continuous spectra are varied, an adverse affect to the wavelength shift correction can be suppressed.

Further, according to this embodiment, the wavelength shift correction is performed with use of a bright line spectrum at the wavelength 764 nm, which belongs to a relatively long wavelength band. This arrangement enables to suppress an adverse affect to the wavelength shift correction due to fluctuation of transmittance and reflectance of an optical element, which is conspicuously found in a short wavelength band with time. In other words, this arrangement is effective in suppressing a phenomenon that transmittance and reflectance of an optical element are likely to fluctuate with time as the wavelength is shorter.

Further, in case of measuring reflection characteristics of a sample with use of the spectral calorimeter 1 equipped with the integrating sphere 10, not only the sample light but also the emission spectra of the reference light are likely to be affected by the reflection characteristics of a sample which is disposed in the predetermined position for measurement as the sample 2. However, according to this embodiment, since wavelength shift correction, namely, measurement of a current spectral profile, is performed in a state that a white color plate for calibration is disposed in the sample opening 13 of the integrating sphere 10 as the sample 2, the aforementioned drawback can be eliminated.

Further, according to this embodiment, the wavelength shift correction is performed following the white calibration in a state that the white color plate that has been used in the white calibration is disposed in the sample opening 13 of the integrating sphere 10 as the sample 2. With this arrangement, calibration in sensitivity (amplitude direction) and correction in wavelength diffusing direction can be performed in sequence. This arrangement does not need an additional operation of disposing a reference sample in the sample opening 13 in performing the wavelength shift correction. In addition, the wavelength shift correction can be started with use of the white calibration switch 54 without providing an additional switch. This arrangement eliminates drawbacks such as complication of the arrangement of the spectral calorimeter 1 and lowering of operability thereof.

According to this embodiment, calculated in advance are the hypothetical spectral sensitivities $G_{i,m}(\lambda+0.1\cdot m)$ which are supposed to be obtained when the spectral sensitivities of the sample light sensor array 36 are varied in the wavelength diffusing direction. The reference spectral profile group $(X_{i,m})_0$ is obtained based on the hypothetical spectral sensitivities for storage in the memory unit 61. The wavelength shift correction amount is obtained by comparing the spectral profile $X_i$ obtained at the time of performing the wavelength shift correction and the reference spectral profile group. With this arrangement, there is no necessity of measuring the spectral sensitivities of a reference color sample, which has been required in the conventional art. Accordingly, there is no need of storing a reference color sample or administering the temperature for its storage. According to the embodiment, the user can easily know the wavelength shift correction amount for wavelength shift correction without the need of returning the colorimeter to the factory for wavelength shift correction.

Further, according to this embodiment, the reference spectral profile group obtained by emission of the xenon flash lamp 12 is stored in the memory unit 61 with respect to each of the spectral colorimeters 1 in calibrating the spectral sensitivities of the spectral colorimeters 1 during production processes thereof in order to calculate the correlations between the stored reference spectral profile group and a spectral profile group obtained on current-time basis. This arrangement provides high correlation to a basic waveform and high adaptability to wavelength shift.

In FIG. 10A, the spectral profile $X_i$ obtained by shifting the spectral sensitivities of the sample light sensor array 36 by −1 nm stepwise is represented as the waveform ② shown by the broken line, and the spectral profile $X_i$ obtained by shifting the spectral sensitivities of the sample light sensor array 36 by +1 nm stepwise is represented as the waveform ③ shown by the dotted line. In FIG. 10B, the differential waveform $dX_i/di$ corresponding to the waveform ② in FIG. 10A is represented as the waveform ② shown by the broken line, and the differential waveform $dX_i/di$ corresponding to the waveform ③ in FIG. 10A is represented as the waveform ③ shown by the dotted line.

Figure 11A:
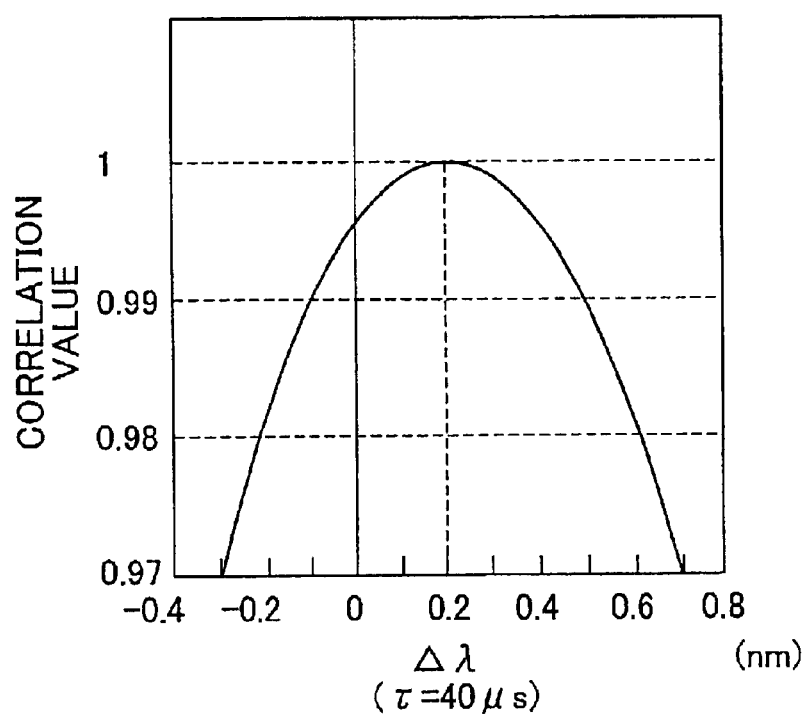
FIGS. 11A and 11B are exemplified curves each showing a relationship between correlation value and wavelength shift amount.
Figure 11B:
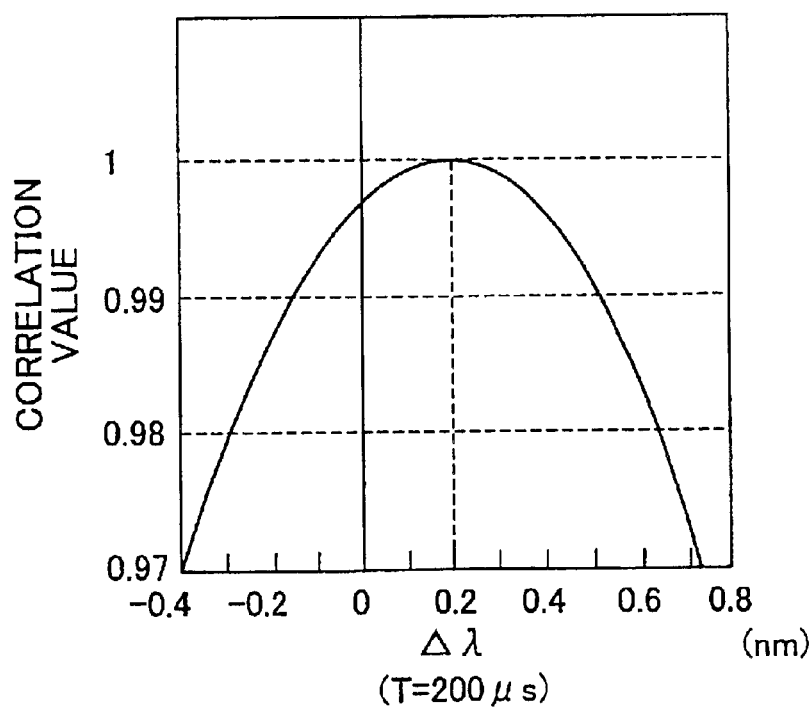

FIGS. 11A and 11B are graphs each depicting an exemplified curve showing a relationship between correlation value and wavelength shift amount. FIG. 11A shows a case where the emission duration of the lamp 12 is set at $\tau=40\,\mu s$, and FIG. 11B shows a case where the emission duration of the lamp 12 is set at $T=200\,\mu s$.

In both of FIGS. 11A and 11B, a maximal correlation value is obtained when the shift amount $\Delta\lambda=0.1\cdot m=+0.2$ nm. However, since the change of the correlation value to the change of the shift amount is much greater in FIG. 11A than in FIG. 11B, it is verified that setting the emission duration shorter makes it easy to obtain a maximal correlation value.

Next, calibration of central wavelengths of spectral sensitivities of the reference sensor array 45 to be implemented in the embodiment is described with reference to the flowchart of FIG. 12.

It is necessary to obtain a precise spectral sensitivity of each sensor constituting the sensor array, particularly, a precise central wavelength thereof in order to perform precise measurement with respect to a spectral colorimeter. It is relatively easy to obtain the spectral sensitivity of each sensor constituting a sensor array adapted to sense sample light by allowing monochromatic light having a sufficient intensity to be incident on each sensor or by measuring spectral characteristics of a reference color sample. However, generally, it is difficult to allow monochromatic light to be incident on each sensor constituting a sensor array adapted to sense reference light or to measure spectral characteristics of a reference color sample, which makes it difficult to obtain a precise central wavelength of the spectral sensitivity of each sensor of the reference sample sensor array. Therefore, it is a common practice to obtain precise spectral sensitivities of the sample light sensor array and to presume that the spectral sensitivities of the reference light sensor array are identical to those of the sample light sensor array.

However, as a matter of fact, the central wavelengths of the spectral sensitivities of the sample light sensor array are not identical to those of the reference light sensor array. Accordingly, in case where a lamp having bright line spectra is used as a light source for illuminating a sample, measurement precision may be lowered. For instance, in the case where a xenon flash lamp is used as an illumination light source, measurement precision may be lowered for the following reason. As shown in FIG. 8, since a great number of bright line spectra are found particularly in the wavelength band from 450 nm to 550 nm, it is impossible to correct the change of intensities of the bright line spectra in the 450 nm–550 nm wavelength band to a sufficient level.

In view of the above, in the above embodiment, calibration of central wavelengths of spectral sensitivities of the reference light sensor array is performed when the spectral colorimeters 1 are manufactured in the factory.

Specifically, referring to FIG. 12, a white color plate for calibration is disposed in the sample opening 13 (Step #200), and the lamp 12 is caused to emit light for a predetermined duration τ in this state (Step #205). Then, spectral profiles respectively output from the sample light sensor array 36 and the reference light sensor array 45 are stored in the memory unit 61 (Step #210).

Subsequently, a spectral profile (e.g., spectral profile of the sample light sensor array) is shifted in the wavelength diffusing direction at the pitch of 0.1 nm stepwise (Step #215), and differential waveforms of spectral profiles of the sample light sensor array and the reference light sensor array are calculated, respectively (Step #220). Then, the differential waveforms of the sample light sensor array and the reference light sensor array are compared (Step #225), and a wavelength shift amount where the correlation is maximal is set as a wavelength difference Δλ between the sample light sensor array 36 and the reference light sensor array 45 (Step #230). Spectral sensitivities $G_i(\lambda+\Delta\lambda)$ obtained by shifting the spectral sensitivity of each sensor of the sample light sensor array 36 by the wavelength difference Δλ are stored as spectral sensitivities of the reference light sensor array 45 in the memory unit 61 (Step #235).

Calibrating the spectral sensitivities of the reference light sensor array 45 in the above-mentioned manner enables to perform measurement more precisely. Furthermore, in the above embodiment, measurement is simultaneously performed with respect to the sample light sensor array 36 and the reference light sensor array 45 by emission of the lamp 12. Accordingly, the measurement is not likely to be subjected to change of emission spectral intensity.

Next, described is a modified method for obtaining a reference spectral profile that is calculated with respect to each spectral colorimeter 1 in the factory at the time of manufacturing thereof and is stored in the memory unit 61 of each spectral colorimeter 1.

Xenon flash lamps 12 of a plurality of spectral colorimeters 1 are each caused to emit light for a predetermined duration τ (e.g., $\tau=40\,\mu s$) in a state as shown in FIG. 6, thereby measuring an emission spectral distribution $I(\lambda)$ with respect to each of the spectral colorimeters 1. Subsequently, one of the spectral colorimeters 1 which provides a typical distribution is selected.

Subsequently, the lamp 12 of the selected spectral colorimeter 1 is caused to emit light while varying its emission duration by 1 μs stepwise to obtain emission spectral distributions $I_{0,n}(\lambda)$ at respective emission durations (τ+n) where n is an integer from −5 to +5.

Subsequently, hypothetical spectral sensitivities $G_{i,m}(\lambda+0.1\cdot m)$, where m is an integer from −10 to +10, are obtained based on the measured spectral sensitivities $G_i(\lambda)$ in a similar manner as in the embodiment with respect to the selected spectral calorimeter 1 for which correction is to be implemented.

Next, a spectral profile group $X_{i,m,n}$, the values obtained when observing the emission spectral distributions $I_{0,n}(\lambda)$ in terms of the spectral sensitivities $G_{i,m}(\lambda+0.1\cdot m)$ are calculated according to Equation (10)

$$X_{i,m,n} = \int G_{i,m}(\lambda+0.1\cdot m)\cdot I_{0,n}(\lambda)d\lambda \qquad (10)$$

where m is an integer from −10 to +10, and n is an integer from −5 to +5, respectively.

Then, the lamp 12 of the spectral colorimeter 1 to be corrected is caused to emit light for a predetermined duration τ (e.g., τ=40 μs). A correlation between the spectral profile $P_i$ obtained from the sample light sensor array 36 of the selected spectral colorimeter 1 and each spectral profile of the spectral profile group $X_{i,m,n}$ is obtained, and the spectral profile where the correlation is maximal is obtained to set n=N, and the spectral profile group $X_{i,m,N}$ having the spectral profile which gives the maximal correlation is stored as a reference spectral profile group $(X_{i,m})_0$ in the memory unit 61.

The above steps are desirable considering the following. When dividing the emission spectral distribution of the xenon flash lamp 12 into bright line spectra around the wavelength 764 nm and continuous spectra other than the bright line spectra, there cannot be neglected an affect due to change of intensities of the bright line spectra to the continuous spectra even if an affect due to individual changes of the respective spectra can be neglected.

In this embodiment, the emission spectral distribution in which intensities of the bright line spectra to the continuous spectra are differed (namely, the intensities of the bright line spectra to the continuous spectra become larger as the emission duration of the lamp 12 is shorter) is obtained by selecting the colorimeter 1 equipped with the lamp 12 which provides a typical emission spectral distribution and by varying the emission duration of the lamp 12 stepwise by setting the predetermined duration τ as a reference value.

A spectral profile most approximate to the actually measured spectral profile is obtained by calculation based on an initial value of the wavelength shift amount of the sample light sensor array 36 and the emission duration of the lamp 12 as parameters. Then, a reference spectral profile group is obtained by shifting the spectral sensitivities of the sample light sensor array 36 by 0.1 nm stepwise with respect to the emission spectral distribution at the emission duration capable of providing the thus calculated spectral profile.

According to the modified method (i), since there is no need of measuring the emission spectral distributions of the lamps 12 of the spectral calorimeters 1 to be corrected individually, a reference spectral profile group can be obtained easily.

"The typical emission spectral distribution" in this embodiment is an emission spectral distribution of a xenon flash lamp of a spectral characteristic measuring apparatus which has a distribution most approximate to an average distribution among the xenon flash lamps 12 whose emission spectral distributions have been measured.

As an altered arrangement of the modified method (i) for obtaining the reference spectral profile, the spectral profile group $X_{i,m,n}$ is stored as a reference spectral profile group $X_{i,m,n}$ in the memory unit 61 in the factory. When a user performs a wavelength shift correction, a correlation between a spectral profile $X_i$ obtained at the time of correction and each reference spectral profile of the stored reference spectral profile group $X_{i,m,n}$ is obtained, and a shift amount (0.1·m) in the reference spectral profile of the reference spectral profile group $X_{i,m,n}$ which gives a maximal correlation is set as a wavelength shift correction amount.

In the above arrangement, even if intensities of the bright line spectra to the continuous spectra are changed with time, a wavelength shift correction amount can be obtained precisely without being affected by such change.

Next, another modified method for obtaining a reference spectral profile is described. First, h number of xenon flash lamps 12 (in this modification, h is an integer larger than 1) of spectral calorimeters 1 are caused to emit light in a state, e.g., as shown in FIG. 6 for a predetermined duration τ (e.g., τ=40 μs) to measure respective emission spectral distributions $I_h(\lambda)$ Then, hypothetical spectral sensitivities $G_{i,m}(\lambda+0.1\cdot m)$ (m is an integer from −10 to +10) are obtained with respect to each of the spectral calorimeters 1 to be corrected based on respective measured spectral sensitivities $G_i(\lambda)$ in the similar manner as above.

Then, a spectral profile group $X_{i,m,h}$ obtained when observing the emission spectral distributions $I_h(\lambda)$ in terms of the hypothetical spectral sensitivities $G_{i,m}(\lambda+0.1\cdot m)$ is obtained according to Equation: $X_{i,m,h} = \int G_{i,m}(\lambda+0.1\cdot m)\cdot I_h(\lambda)d\lambda$ where m is an integer from −10 to +10.

Next, the lamps 12 of the spectral colorimeters 1 to be corrected are caused to emit light for a predetermined duration τ (e.g., τ=40 μs) A correlation between spectral profile $P_i$ that has been measured with respect to the sample light sensor array 36 in each spectral colorimeter 1 and each spectral profile of the spectral profile group $X_{i,m,h}$ is obtained to find a spectral profile which gives a maximal correlation. Then, the spectral profile group $X_{i,m,H}$ having the spectral profile where h=H is stored as a reference spectral profile group $(X_{i,m})_0$ in the memory unit 61.

According to the modified method (ii), since there is no need of measuring emission spectral distributions of the lamps 12 of the spectral calorimeters 1 to be corrected individually, a reference spectral profile group can be obtained easily.

Further, even if emission spectral distributions of the lamps 12 of the spectral colorimeters 1 to be corrected are varied, lowering of precision in performing a precise wavelength shift correction can be suppressed because the emission spectral distribution which gives a maximal correlation is selected among the h number of emission spectral distributions in the modified arrangement.

Figure 13:
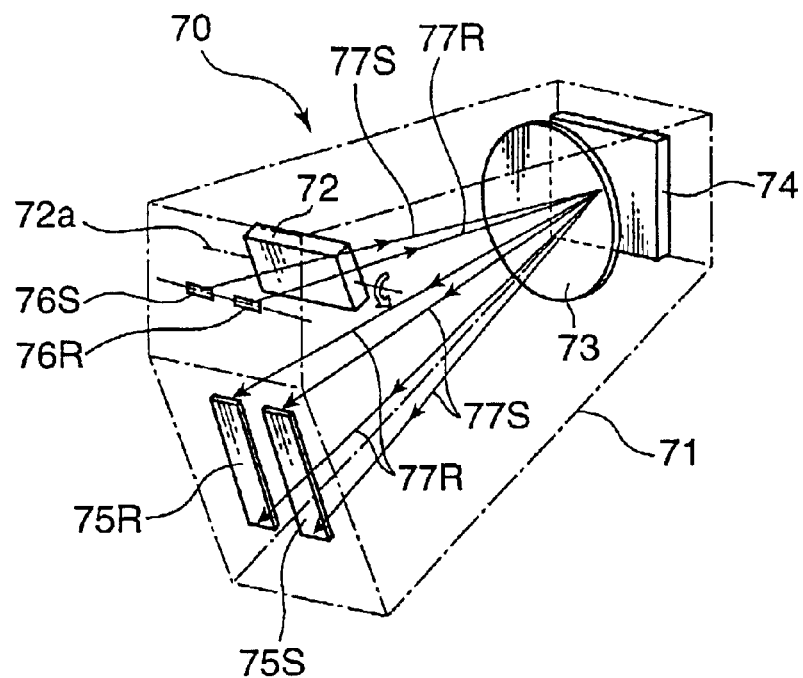
FIG. 13 is a perspective view showing a mechanical construction of a double-channel light separator.
Figure 14:
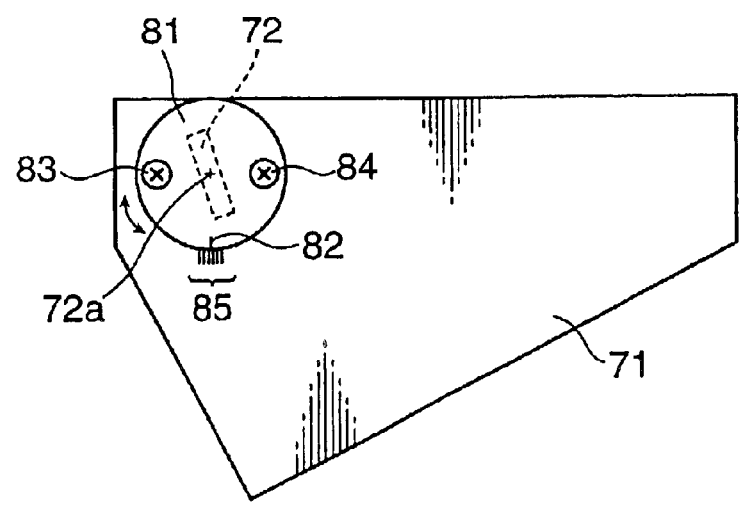
FIG. 14 is a side view showing an arrangement as to how an infrared ray blocking filter is mounted.

Next, a modification provided with a spectral arrangement equipped with a sample light separator and a reference light separator is described with reference to FIGS. 13 to 16. FIG. 13 shows a mechanical arrangement of a double-channel light separator. FIG. 14 shows an arrangement as to how an infrared ray blocking filter is mounted on the double-channel light separator.

In this modification, as shown in FIG. 13, a colorimeter is provided with the double-channel light separator 70 in place of the sample light separator 33 and the reference light separator 42 (see FIG. 1). The double-channel light separator 70 has a housing 71 made of, e.g., a synthetic resin. The infrared ray blocking filter 72, a collimator lens 73, a reflective grating member 74, a sample light sensor array 75S and a reference light sensor array 75R are mounted on the housing 71.

A sample light incident slit 76S and a reference light incident slit 76R are formed in the housing 71 at such positions as to allow light from light emerging ports of optical fibers 32, 41 (see FIG. 1) to be incident therethrough, respectively. The optical fibers 32, 41 (see FIG. 1) each is composed of a bundle of fibers whose section has an elongated rectangular shape so as to match with the shapes of the incident slits 76S, 76R, respectively.

The housing 71 is made of a synthetic resin in view of cost, weight, and formability. Using such material resultantly may cause dimensional shift with time. In view of this, wavelength shift correction with time is indispensable in order to maintain measurement precision of the measuring apparatus.

The infrared ray blocking filter 72 is made of, e.g., a plane-parallel glass, and is disposed at an inner position of the housing 71 right next to the incident slits 76S, 76R. As shown in FIG. 14, the infrared ray blocking filter 72 is mounted on a filter holder 81 in such a manner that manipulating the filter holder 81 from outside of the housing 71 enables to angularly displace the infrared ray blocking filter 72 about an axis of a shaft 72a in parallel to the incident slits 76S, 76R in a range of several degrees. With this arrangement, the infrared ray blocking filter 72 is enabled to be fixed at a desired angular displaced position.

Specifically, the infrared ray blocking filter 72 can be positioned at a desired position by loosening screws 83, 84, rotating the filter holder 81 in a certain direction by referring to a pointer 82 engraved in the filter holder 81 and scales 85 engraved in the housing 71 at the pitch of 1°, and fastening the filter holder 81 at a desired position with the screws 83, 84 again. While the infrared ray blocking filter 72 is angularly displaced in this way, an incident angle of ray 77S (77R) incident on the infrared ray blocking filter 72 through the incident slit 76S (76R) can be desirably changed.

Sample light and reference light emerging from the optical fibers 32, 41 (see FIG. 1) pass through the incident slits 76S, 76R and become light rays 77S, 77R, respectively. After transmitting the infrared ray blocking filter 72, the rays 77S, 77R become parallel rays by the collimator lens 73, and then are subjected to reflection and diffusion on the reflective grating member 74. The thus reflected and diffused rays of light are focused on light sensing planes of the sensor arrays 75S, 75R after passing the collimator lens 73 again.

Similar to the arrangement of the embodiment, the sensor arrays 75S, 75R each consist of a plurality of photoelectric conversion elements (sensors) arrayed at the pitch of about 10 nm in terms of the wavelength of diffused light. Electric signals corresponding to received light intensities output from the sensors are processed in a controlling section 60 (see FIG. 1).

Figure 15:
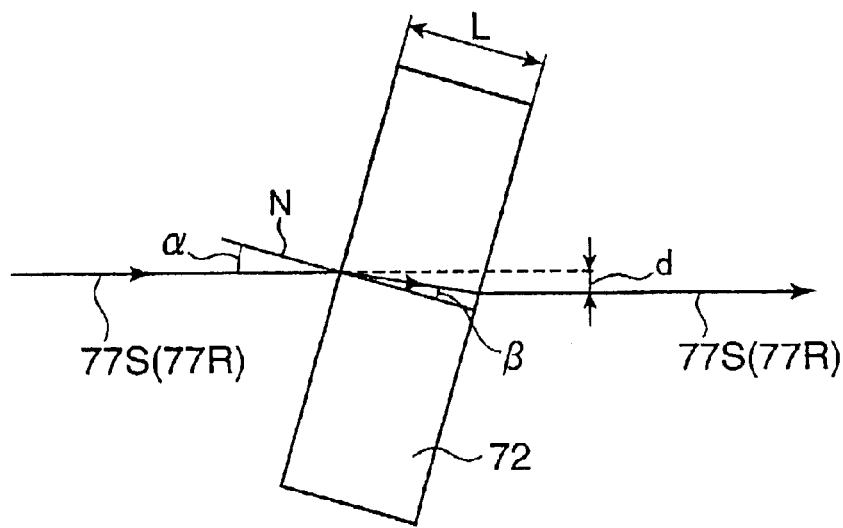
FIG. 15 is a side view showing refractions of an incident light ray and an emerging light ray incident on and emerging from the infrared ray blocking filter.

The incident ray 77S (77R) is, as shown in FIG. 15, refracted on the incident plane of the infrared ray blocking filter 72 at a certain incident angle, and is refracted on the light emerging plane thereof to emerge therefrom in accordance with Snell's law, thus emerging as a parallel ray to the incident ray. With this arrangement, the emerging ray is in parallel to the incident ray spaced apart therefrom by the distance d wherein d is defined as Equation (11)

$$d = L \cdot \sin(\alpha - \beta)/\cos \beta \quad (11)$$

where L is a thickness of the infrared ray blocking filter 72 (in this embodiment, e.g., L=3 mm), $\alpha$ is an incident angle (angle defined by the normal line N to the infrared ray blocking filter 72 and an axis of incident light, in this embodiment, e.g., $\alpha$=3, 4, 5, 6, 7°), and $\beta$ is an emerging angle defined as Equation (12)

$$\beta = \sin^{-1}(\sin \alpha/n) \quad (12)$$

where n is a refractive index of the infrared ray blocking filter 72 (in this embodiment, e.g. n=1.5).

The above shift amount d of the emerging ray to the incident ray caused by the infrared ray blocking filter 72 is equivalent to variation in which the incident slit 76S (76R) is displaced in parallel to the width direction of the slit (diffusing direction of the wavelength) viewed from the grating member 74 on which the sample light (reference light) is incident. In view of the above, it is possible to intentionally cause wavelength shift of the sensor array 75S (75R) by varying the shift amount d.

This modified arrangement is constructed in such a manner that the position of the infrared ray blocking filter 72 where the incident angle $\alpha \approx 5°$ is set as a reference position and that wavelengths are shifted from the reference position about ±0.5 nm, ±1 nm by angularly displacing the infrared ray blocking filter 72 about ±1, ±2°, respectively.

Figure 16:
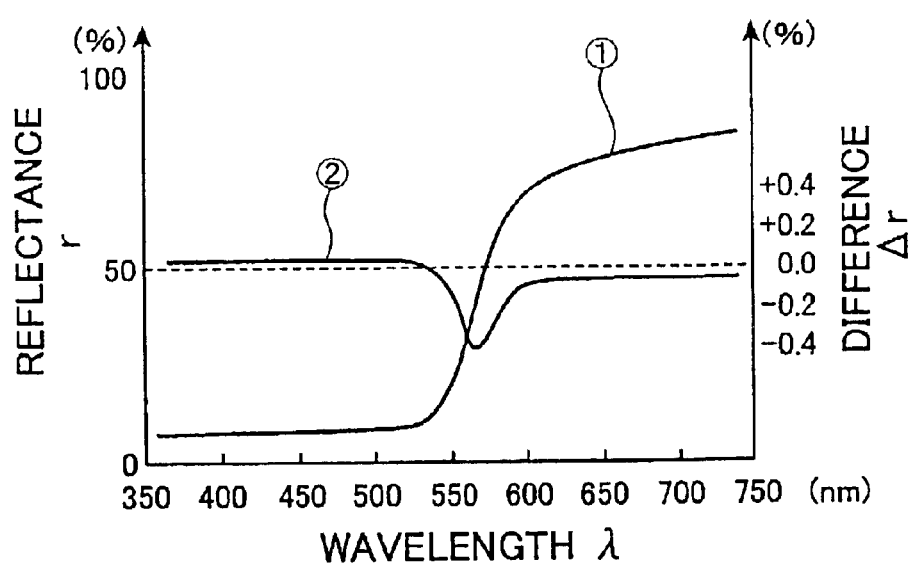
FIG. 16 is a graph showing characteristics, namely, spectral reflectance and differential waveform, of a reference sample.

Next, a method for obtaining a reference profile and steps of a procedure to perform wavelength shift correction in the modification are described. FIG. 16 is a diagram showing characteristics, namely, a spectral reflectance and a differential waveform of a reference sample.

First, a reference sample of an orange color is disposed in a sample opening 13 of an integrating sphere 10 (see FIG. 1). The reference sample has such a spectral reflectance that a peak appears sharply around the wavelength 570 nm which falls substantially in a center of a wavelength band from 380 to 780 nm, as shown in the characteristic curve ① in FIG. 16. The infrared ray blocking filter 72 is angularly displaced by a predetermined angle relative to the reference position (incident angle $\alpha$=5°) stepwise (in this embodiment, 5-steps in incident angle, e.g., incident angle $\alpha_{-10}$=3°, $\alpha_{-5}$=4°, $\alpha_0$=5°, $\alpha_5$=6°, $\alpha_{10}$=7°), and the lamp 12 is caused to emit light at their respective incident angles. Light reception signals $S_{i,k}$, $R_{i,k}$ respectively output from the sample light sensor array 75S and the reference light sensor array 75R are stored in the memory unit 61 where i is the sensor number of the sensor array, and k is an index (k=−10, −5, 0, 5, 10) of the incident angle $\alpha_k$ at which the ray 77S (77R) is incident on the infrared ray blocking filer 72.

In varying the mounting angle of the infrared ray blocking filter 72, measurement at the incident angle $\alpha_0$=5° is performed at a final stage of the measurement, and the infrared ray blocking filter 72 is fixed thereat.

Similar to the above embodiment, spectral sensitivities $g_i(\lambda)$ of the respective sensors of the sensor array are measured with e.g. a monochrometer, and spectral sensitivities $G_i(\lambda)$ obtained by approximation of these spectral sensitivities $g_i(\lambda)$ based on a Gaussian function are calculated according to Equation (13)

$$G_i(\lambda) = B_i \cdot \exp[c \cdot \{(\lambda - \lambda c_i)/d\lambda_i\}^2] \quad (13)$$

where $B_i$ is an amplitude, c is a coefficient, $\lambda c_i$ is a central wavelength, and $d\lambda_i$ is a half bandwidth of each spectral sensitivity.

Matrix $A_{j,i}$ is obtained according to Equation (13) and Equation (3). Inverse matrix $A_{j,i}^{-1}$ to matrix $A_{j,i}$ is obtained. Then, dark calibration is performed in which dark calibration values are obtained according to Equation (5), and white calibration is performed in which white calibration coefficients are obtained according to Equation (6).

Next, the light reception signals $S_{i,k}$, $R_{i,k}$ stored in the memory unit 61 are converted to data at the pitch of 10 nm by implementing Equation (2) with use of the inverse matrix $A_{j,i}^{-1}$. Spectral reflectances $r_{k,0}(\lambda)(k=-10, -5, 0, 5, 10)$ of a reference sample of an orange color at each angular position of the infrared ray blocking filter 72 are obtained according to Equation (7) with use of the dark calibration values and the white calibration coefficients.

A reflectance difference $\Delta r_{-10,0}(\lambda)$ between the spectral reflectance $r_{-10,0}(\lambda)$ at k=−10 and the spectral reflectance $r_{0,0}(\lambda)$ at k=0 is obtained according to Equation (14)

$$\Delta r_{-10,0}(\lambda) = r_{-10,0}(\lambda) - r_{0,0}(\lambda) \quad (14)$$

Then, a waveform having a peak around a rising wavelength of the reference sample is obtained, as shown in the characteristic curve ② in FIG. 16. In the example of FIG. 16, the spectral reflectance $r_{-10,0}(\lambda)$ appears in a longer wavelength band than the spectral reflectance $r_{0,0}(\lambda)$.

In view of the above, the central wavelength $\lambda c_i(\lambda)$ of the spectral sensitivity $G_i(\lambda)$ in Equation (13) is shifted little by little stepwise, and each time of the shifting, the spectral reflectance $r_{-10,0}(\lambda)$ is obtained according to the above procedure, and the corresponding reflectance difference $\Delta r_{-10,0}(\lambda)$ is obtained. Then, the peak values at the respective reflectance differences $\Delta r_{-10,0}(\lambda)$ are compared, and a shift amount $\Delta\lambda c_{-10}$ where the peak value approximates to 0 is obtained.

In the similar manner as above, shift amounts $\Delta\lambda c_{-5}$, $\Delta\lambda c_5$, $\Delta\lambda c_{10}$ are obtained with respect to k=−5, 5, 10 for storage in the memory unit 61.

Data of the sensors (e.g., sensors having the sensor number i=34 to 40) adapted to receive light in the wavelength band including the wavelength 764 nm are standardized based on their peak values among the light reception signals $R_{i,k}$ that have been output from the reference sensor array 75R and stored in the memory unit 61. The standardized data are a reference spectral profile group $(X_{i,k})_0$ corresponding to the shift amounts $\Delta\lambda c_k$, where k=−10, −5, 0, 5, 10. Further, a reference spectral profile group $(X_{i,m})_0$ corresponding to shift amounts $\Delta\lambda c_m=0.1 \cdot m$ at the pitch of 0.1 nm are obtained in association with the spectral profile with respect to each shift amount and each sensor number i from the above data extracted from the five different sites for storage in the memory unit 61, where m is an integer from −10 to +10. Further, differential waveforms $d(X_{i,m})_0/di$ are obtained for storage in the memory unit 61.

Next, described is a wavelength shift correction to be implemented by a user. After the white calibration, the lamp 12 is caused to emit light to obtain a spectral profile $X_i$ in the wavelength band including the wavelength 764 nm based on the light reception signals $R_{i,k}$ output from the reference light sensor array 75R. In the similar manner as the embodiment, a reference spectral profile $(X_{i,M})_0$ which gives a maximal correlation is obtained by comparing the differential waveforms. A shift amount $\Delta\lambda c_M$ corresponding to M in the reference spectral profile $(X_{i,M})_0$ is set as a wavelength shift amount. Matrix $A_{j,i}$ is obtained by substituting the spectral sensitivities $G_i(\lambda)$ in Equation (3) wherein the spectral sensitivities $G_i(\lambda)$ are obtained by shifting the central wavelengths $c_i\lambda$ of the spectral sensitivities $G_i(\lambda)$ in Equation (13) by the correction amount. Inverse matrix $A_{j,i}^{-1}$ to matrix $A_{j,i}$ is obtained for storage in the memory unit 61. In the sample light measurement that follows the storage, wavelength shift is corrected by substituting the inverse matrix $A_{j,i}^{-1}$ in Equation (2).

Thus, in the modification, wavelength shift correction amount for the reference light sensor array can be obtained in the similar manner as the embodiment.

Further, as shown in FIG. 13, since the positions of the sample light sensor array 75S and the reference light sensor array 75R mounted on the housing 71 to the grating member 74 are substantially equal to each other in the wavelength diffusing direction, the calculated wavelength shift correction amount can be applied to both of the sample light sensor array 75S and the reference light sensor array 75R based on an assumption that the wavelength shift amount of the sample light sensor array 75S is the same as that of the reference light sensor array 75R.

In the modification, the reference spectral profile and the wavelength shift correction amount are calculated with use of the light reception signals output from the reference light sensor array 75R. Light reception signals from the sample light sensor array 75S may be used.

Referring back to FIG. 13, the double-channel light separator is so constructed as to intentionally cause wavelength shift by rotating the infrared ray blocking filter 72. The manner of causing wavelength shift is not limited to the above. Alternatively, blocking means for blocking part of rays of light may be used to intentionally cause wavelength shift.

Now, an exemplified modified spectral arrangement is described with reference to FIGS. 18A through 21.

Figure 18C:
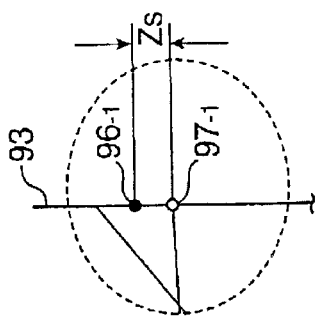
FIGS. 18A to 18C are diagrams explaining the principle of causing wavelength shift by a blocking member.
Figure 18A:
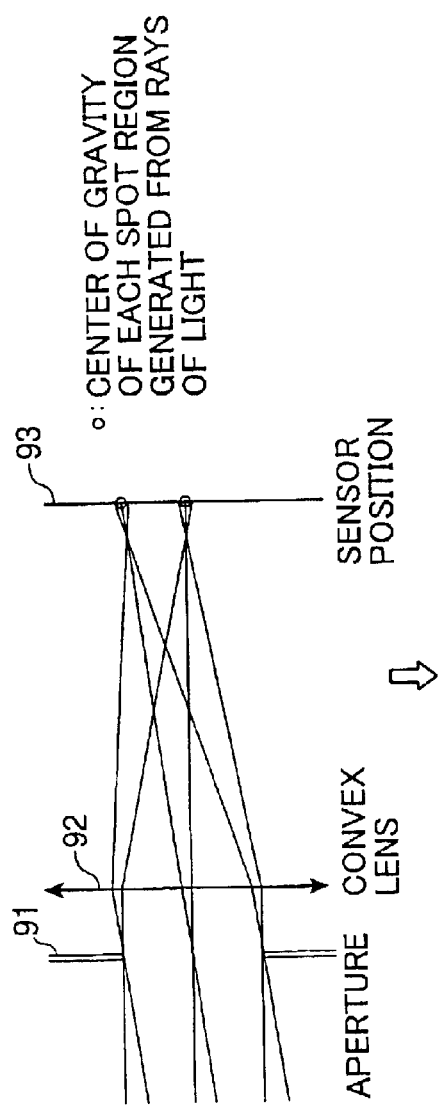
Figure 18B:
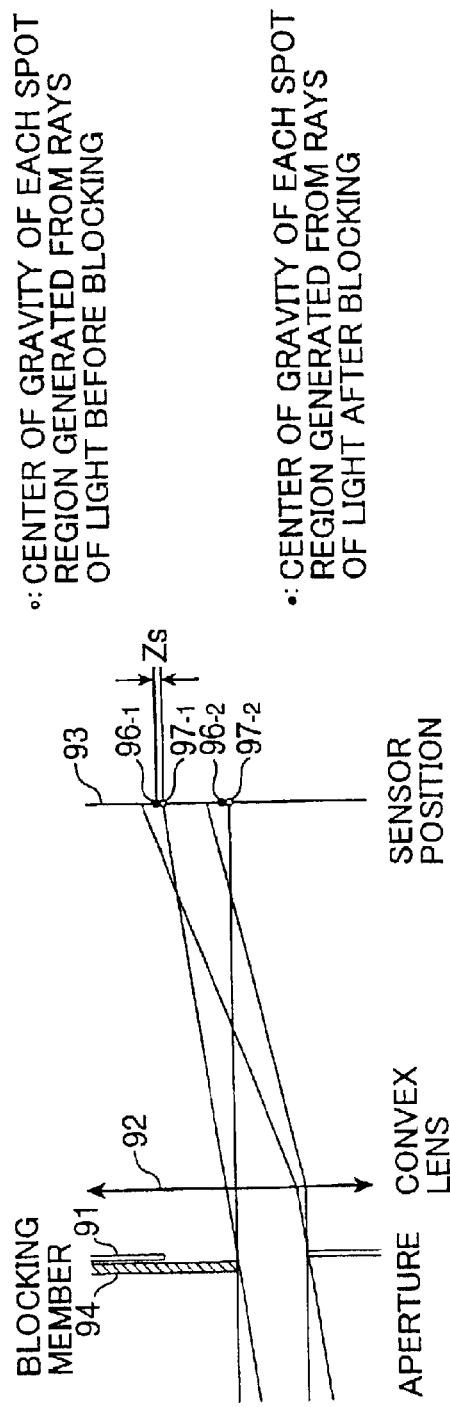

FIGS. 18A to 18C are diagrams explaining the principle of causing wavelength shift by a blocking member. FIG. 18A is a diagram showing the center of gravity of exemplary spot regions generated from rays of light before the rays of light are blocked from a blocking member. FIG. 18B is a diagram showing the center of gravity of exemplary spot regions generated from rays of light after part of the rays of light is blocked from the blocking member. FIG. 18C is an enlarged diagram showing one of the exemplary spot regions in FIG. 18B. The hollow circles ○ in FIGS. 18A to 18C indicate the center of gravity of the spot regions generated from rays of light before the rays of light are blocked from the blocking member. The solid circles ● in FIGS. 18A to 18C indicate the center of gravity of the spot regions generated from rays of light after part of the rays of light is blocked from the blocking member.

In FIG. 18A, rays of light are incident through an aperture 91 and received on a sensor array 93 via a convex lens 92. The rays of light are condensed on the sensor array 93 as spot regions by action of the convex lens 92. Each spot region is divided into two sections, namely, a center spot having a large luminance, and a halo region which is a peripheral region around the center spot. Since the rays of light are uniformly incident on the convex lens 92 before blocking, the center of gravity of the spot region is generally located at the center spot.

In the above state, a plate-like blocking member 94 is inserted from an end of the aperture 91 to block part of the rays of light. Then, as shown in FIGS. 18B and 18C, since part of the rays of light is blocked from being incident on the convex lens 92, the center of gravity of each spot region on the sensor array 93 is shifted due to aberration of the convex lens 92. For example, the center of gravity ○ 97-1 of one spot region before blocking is shifted to the center of gravity ● 96-1 after the blocking. The center of gravity ○ 97-2 of another spot region before blocking is shifted to the center of gravity ● 96-2 after the blocking. A shift amount Zs, which is a difference in the center of gravity of each spot region between before and after the insertion of the blocking member 94, is determined in accordance with an amount of blocking by the blocking member 94. The direction of inserting the blocking member 94 coincides with a direction of dispersing a light image in order to move the image in the dispersing direction. Various aberration techniques such as spherical aberration, coma aberration, and astigmatism are applicable because the center of gravity of the spot region can be intentionally shifted with use of a blocking member and aberration. Spherical aberration is preferable because spherical aberration enables to increase the shift amount Zs in proportion to increase of the blocking amount.

Figure 19:
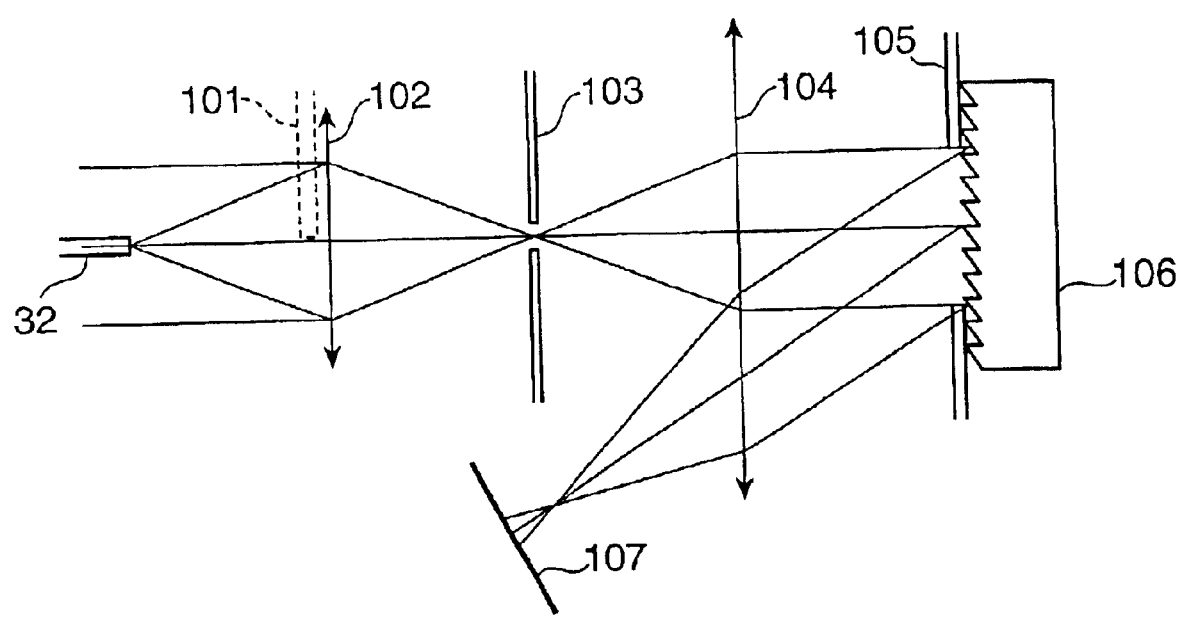
FIG. 19 is a diagram showing an exemplified arrangement of a sample light separator for causing wavelength shift by a blocking member.

Next, an exemplified arrangement to intentionally cause wavelength shift with use of such aberration is described with reference to FIG. 19. A sample light separator shown in FIG. 19 corresponds to the sample light separator 33 exemplarily shown in FIG. 1. FIG. 19 is a diagram showing a modified arrangement of the sample light separator to cause wavelength shift by blocking.

In FIG. 19, the sample light separator includes a convex lens 102, a slit member 103, a convex lens 104, an aperture 105, a grating member 106, and a sample light sensor array 107.

Rays of light emerging from an optical fiber 32 of a sample light measuring section 30 are focused in an opening of the slit member 103 after passing the convex lens 102, and incident on the grating member 106 via the convex lens 104.

The grating member 106 is arranged on the aperture 105 with its grating surface opposed to the aperture 105. The grating member 106 is adapted to separate rays of light that have been incident thereon via the convex lens 104 according to the wavelength bands and guide the rays of light in each wavelength band toward the sample light sensor array 107, which in turn reflects the rays of light toward the convex lens 104. The rays of light incident on the convex lens 104 are then incident on the sample light sensor array 107.

The sample light sensor array 107 has substantially the same arrangement as the sample light sensor array 36, and consists of an array of photoelectric conversion elements arrayed in the wavelength diffusing direction along which the grating member 106 separates the rays of light. The sample light sensor array 107 receives light in different wavelength bands, and outputs electric signals corresponding to the received light intensities. The electrical signals are output to a controlling section 60 for processing.

A blocking member 101 for blocking rays of light is arranged outside of the sample light separator and close to an aperture (not shown) of the sample light separator which is disposed in front of the convex lens 102. The blocking member 101 is preferably an auxiliary member independently provided of the sample light separator. Independently providing such an auxiliary member enables to use the auxiliary member in common to all the spectral calorimeters in a wavelength shift correction process, thus contributing to suppressing production cost rise of the spectral calorimeters. It is needless to say that the blocking member 101 may be equipped in the sample light separator.

In the above arrangement, inserting the blocking member 101 for blocking part of rays of light enables to intentionally cause wavelength shift on the aperture 105 where the grating member 106 is located, due to aberration of the convex lens 104. The magnitude of aberration is determined based on a blocking amount set in advance and a maximal wavelength shift amount which an operator wishes to intentionally cause.

In the above modification, the sample light separator is so constructed as to cause wavelength shift with use of a blocking member. Alternatively, it may be possible to construct the reference light separator in the similar manner as the sample light separator to cause wavelength shift with use of a blocking member.

Next, a method for obtaining a reference spectral profile and operations of correcting wavelength shift are described.

Figure 20:
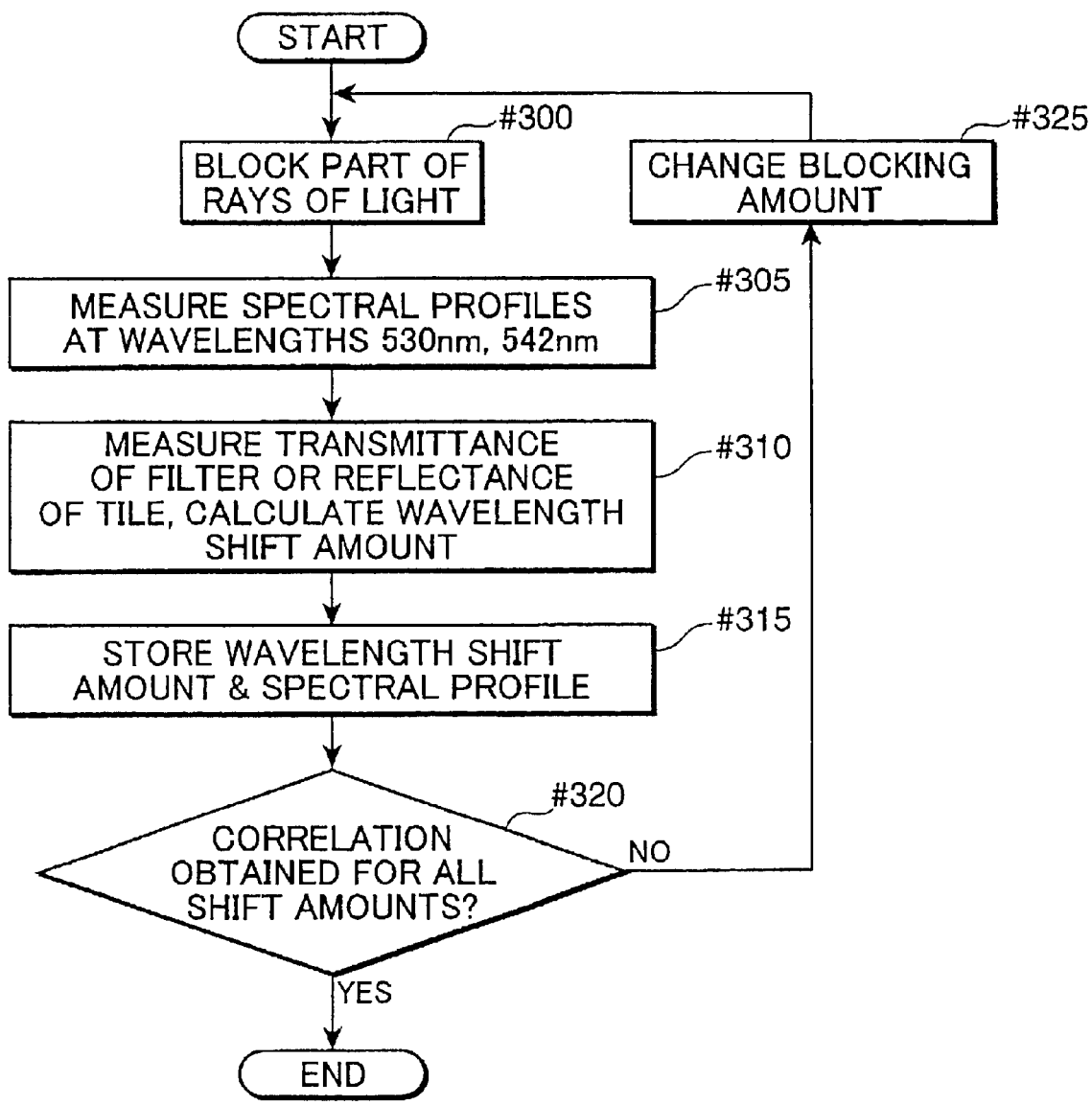
FIG. 20 is a flowchart showing operations of obtaining correlation between reference spectral profile and wavelength shift amount.

FIG. 20 is a flowchart showing an exemplified method of obtaining a correlation between a reference spectral profile and a wavelength shift amount.

In this modification, a correlation between a reference spectral profile and a wavelength shift amount is obtained by obtaining a correlation between a blocking amount and the reference spectral profile, and then by obtaining the blocking amount and the wavelength shift amount.

In FIG. 20, the blocking member 101 blocks part of rays of light from being incident at a certain blocking amount (in Step #300). Then, a spectral profile at the wavelengths 530 nm and 542 nm of a xenon flash lamp are measured (in Step #305). Although the bright lines at the wavelengths 530 nm, 542 nm are advantageous in that light amounts thereof are sufficiently large compared to continuous light even if the emission duration is relatively long, these bright lines lie in a wavelength band where deterioration of the optical element may adversely affect the measurement precision of the spectral calorimeter.

Next, a transmittance of a sharp cut filter or a reflectance of a tile having a sharp spectral characteristic in the wavelength band including the bright lines are measured to calculate a wavelength shift amount from the measurement results. More specifically, a sharp cut filter is arranged near an aperture (not shown) disposed in front of the convex lens 102, and measured are transmittances of the sharp cut filter before and after blocking with the blocking member 101. Since two bright lines at the wavelengths 530 nm, 542 nm are used in this modification, a sharp cut filter having a characteristic of showing a sharp rise in the wavelength band covering these two wavelengths is used. In the case where there is a difference in transmittance of the filter between before and after the blocking, a shift amount where the transmittance difference comes close to zero is sought out by using matrix $A_{j,i}$ in which the center wavelength is shifted stepwise with respect to each spectral profile at an initial state of a spectral colorimeter, thus obtaining the wavelength shift amount (in Step #310).

Next, the reference spectral profile obtained in Step #305 and the wavelength shift amount obtained in Step #310 are correlated, and the correlation is stored in a memory unit 61 (in Step #315).

Then, it is judged whether the correlation between the reference spectral profile and the wavelength shift amount has been obtained with respect to all the wavelength shift amounts to be measured (in Step #320). If it is judged that the correlation has been obtained with respect to all the wavelength shift amounts (YES in Step #320), the routine ends. If it is judged that the correlation has not been obtained with respect to all the wavelength shift amounts (NO in Step #320), the blocking amount is changed (in Step #325), and the routine goes back to Step #300. Thus, the operations from Steps #300 to #320 are cyclically repeated by changing the blocking amount stepwise (in Step #325) until the correlation between the reference spectral profile and the wavelength shift amount has been established with respect to all the wavelength shift amounts.

In order to raise wavelength shift correction precision, it is preferable to define a correlation between the wavelength shift amount and the reference spectral profile at a small pitch (e.g., pitch at 0.1 nm), and in order to obtain a correlation between the wavelength shift amount and the reference spectral profile in a short term, it is preferable to measure the transmittance at a large pitch (e.g., pitch at 0.5 nm) and to obtain the correlation by interpolation. The method of utilizing interpolation is preferable in the aspect of saving memory storage capacity. For instance, in case of creating a lookup table with respect to five wavelength shift amounts, e.g., 0 nm, +0.5 nm, +1.1 nm, −0.5 nm, −1.1 nm, first, the transmittance of the sharp cut filter is measured at several different blocking amounts in advance to obtain the correlations between the wavelength shift amounts and the blocking amounts. The blocking amounts that give the above five wavelength shift amounts are obtained by interpolation based on the thus obtained correlations between the blocking amounts and the wavelength shift amounts. Then, a correlation between the reference spectral profile and the transmittance of the sharp cut filter is measured with respect to each of the blocking amounts corresponding to the five different wavelength shift amounts. The correlations between the reference spectral profile group and the wavelength shift amounts are obtained based on the measurement results for storage in the memory unit 61. In the case where the obtained wavelength shift amount does not coincide with any of the five different wavelength shift amounts, a corresponding reference spectral profile is set by approximation.

In case of using a dual channel polychromator, it is theoretically possible to judge that the wavelength shift amount in the sample light separator and that in the reference light separator are substantially the same. Accordingly, it is possible to perform measurement of the wavelength shift amount with respect to either one of the sample light separator and the reference light separator while performing measurement of the reference spectral profile with respect to the other one of the sample light separator and the reference light separator to shorten the time for correction.

Further, it is difficult to say that the emission spectral distribution of a xenon flash lamp is stabilized all the time. Accordingly, it is preferable to perform measurement a number of times and to obtain a mean value of the measurement results in order to raise correction precision.

Next, a wavelength shift correction to be implemented by a user is described.

Figure 21:
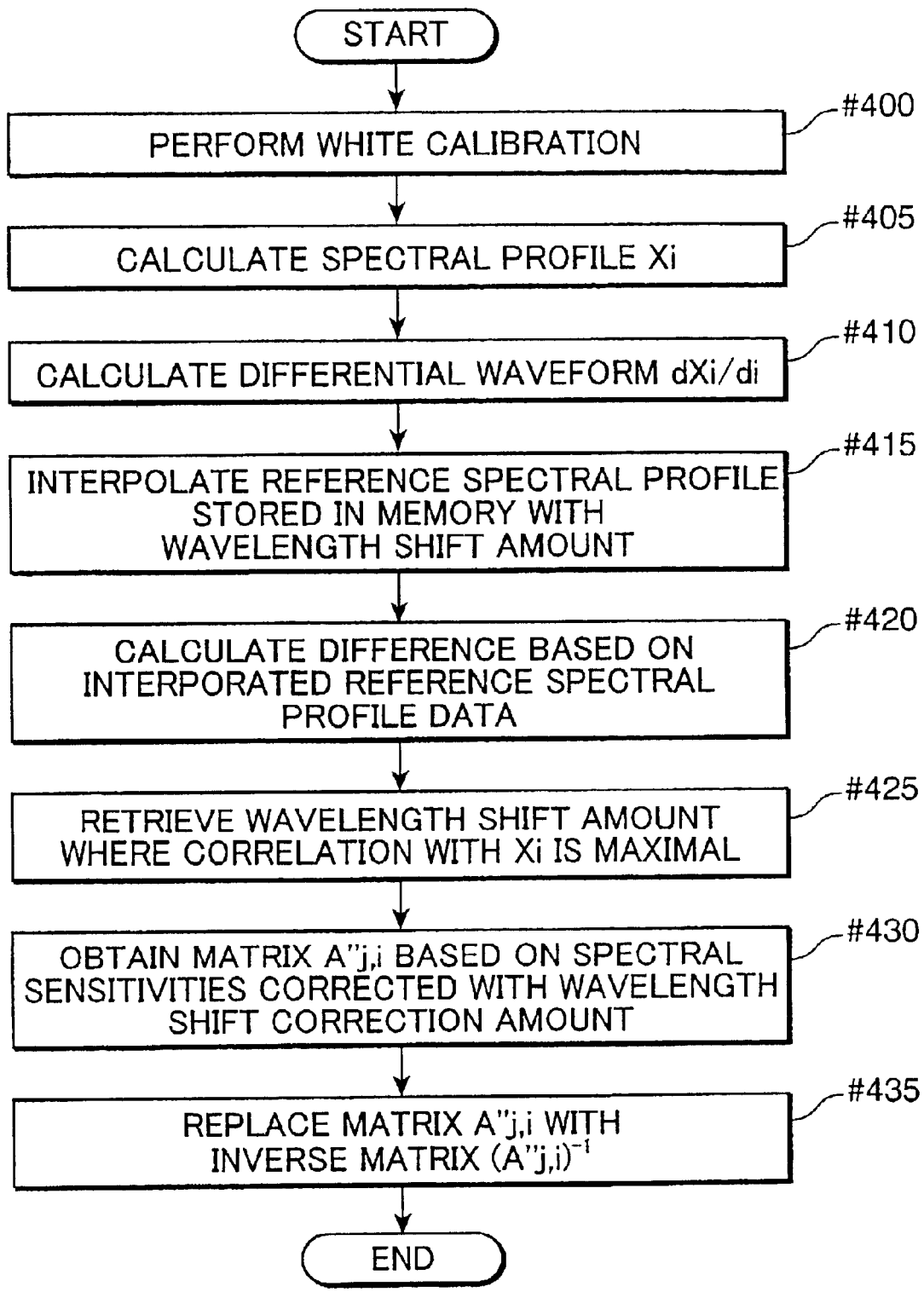
FIG. 21 is a flowchart showing operations of an exemplified method of correcting wavelength shift.

FIG. 21 is a flowchart showing operations of performing wavelength shift correction.

In FIG. 21, a white calibration switch 54 is depressed to perform white calibration (in Step #400). Then, a lamp 12 is caused to emit light for a certain duration $\tau$ in a state that a white plate for calibration is disposed in a sample opening 13 to obtain a spectral profile $X_i$ of a sensor having the sensor number i which is disposed in the wavelength band from 530 nm to 550 nm based on an output signal from the sensor array 107 (in Step #405). Then, a differential waveform $dX_i/di$ is obtained based on the spectral profile $X_i$ (in Step #410).

Next, interpolation is performed with respect to the reference spectral profile group stores in the memory unit 61 by using the wavelength shift amount (in Step #415). For example, data of reference spectral profile group are created at a pitch of 0.05 nm in the wavelength shift range from −1 nm to +1 nm. Then, 41 data are created.

Next, the thus created reference spectral profile data are converted to differential data (in Step #420). Correlation values between the differential data and the differential waveform $dX_i/di$ are calculated one after another to obtain a maximal correlation value. Then, the wavelength shift amount corresponding to the reference spectral profile that gives the maximal correlation value is retrieved as a wavelength shift correction amount (in Step #425).

Next, matrix $A''_{j,i}$ is obtained based on the wavelength shift correction amount (in Step #430), and then inverse matrix $(A''_{j,i})^{-1}$ to the matrix $A''_{j,i}$ is obtained for storage in the memory unit 61 (in Step #435).

In the sample measurements following the above steps, the spectral sensitivity $P_j$ of the sample is obtained with use of the inverse matrix $(A''_{j,i})^{-1}$ in place of the matrix $A_{j,i}^{-1}$.

According to the method for causing wavelength shift by the blocking means, partly blocking rays of light passing through the aperture of the lens of the sample light separator or the reference light separator enables to cause wavelength shift. This arrangement is advantageous in the aspect of cost reduction compared to the embodiment in which wavelength shift is caused by the infrared ray blocking filter 72 because the embodiment necessitates providing a mechanical mechanism for rotating the infrared ray blocking filter 72.

In the above modification, merely data before interpolation are registered in the lookup table concerning the correlation between the wavelength shift amount and the spectral profile stored in the memory unit 61. Alternatively, data after interpolation may also be registered in the lookup table, or differential data of the reference spectral profile group may be stored in the lookup table in order to shorten the time for performing the wavelength shift correction to be implemented by the user.

The invention is not limited to the foregoing embodiment and modification, and may be applicable to the following modifications and alterations.

(1) In the embodiment, the spectral sensitivity is always corrected with use of the calculated wavelength shift correction amount. Alternatively, the controlling section 60 may be operated to discriminate whether the wavelength shift correction amount reaches a predetermined value (e.g., 0.2 nm) and to perform wavelength shift correction only after the judgment that the wavelength shift correction amount has reached the predetermined value. With the altered arrangement, securing continuity of measurement data is prioritized.

Further, in the case where the wavelength shift correction amount has exceeded the predetermined value, a value designated based on the wavelength shift correction amount, e.g., the above predetermined value or a value smaller than the predetermined value may be used as a shift amount for the spectral sensitivity in place of the wavelength shift correction amount in view of the following. Namely, keeping correcting the wavelength shift by the wavelength shift correction amount even after the wavelength shift correction amount has exceeded the predetermined value may likely to lose continuity of measurement values. However, correcting the wavelength shift by the amount designated based on the wavelength shift correction amount enables to secure continuity of measurement values.

Further, an arrangement may be provided such that the display section 55 is caused to display that the wavelength shift correction amount has reached the predetermined value and that the user is merely notified of the fact without causing the apparatus to perform the wavelength shift correction. Also, an arrangement may be provided such that the display section 55 is caused to display that the wavelength shift correction amount has reached the predetermined value and that the user is requested to perform measurement again so as to allow the apparatus to perform correction if the display result after the re-measurement is the same as the display result before the re-measurement.

As an altered arrangement, the operation panel section 50 may be provided with a designation switch for designating the value for the wavelength shift correction, the CPU 62 may have a function of setting the value designated at the designation switch as the predetermined value for the correction. With the altered arrangement, the user can optimally change the predetermined value for the correction. Also, the operation panel section 50 may be provided with a selection switch for designating the mode for performing a wavelength shift correction, and the CPU 62 may have a function of determining whether the wavelength shift correction is performed according to the operation result of the selection switch. With the altered arrangement, the user is allowed to determine whether the correction should be performed.

(2) In the embodiment, since the same wavelength shift correction amount is applied throughout the whole wavelength bands, a measurement error may likely to occur if a wavelength shift is exceedingly large. In view of this, an alert message may be displayed on the display section 55 in case where the wavelength shift correction amount has exceeded a predetermined value (e.g., 1.0 nm) to request the user to return the spectral colorimeter 1 to the factory for re-calibration.

In the above arrangement, the spectral calorimeter 1 can be returned to the manufacturer whenever need arises to do so, thereby enabling to provide maintenance at a proper timing.

(3) In the embodiment, the wavelength shift correction is performed by using the bright line spectrum of the xenon flash lamp 12 at the wavelength 764 nm. An altered arrangement may be employed. Specifically, bright line spectra having a sharp peak in a wavelength band of 700 nm or longer in the spectral intensity distribution ① obtained when the emission duration is 40 μs as shown in FIG. 8 may be used. Further, as shown in FIG. 8, there exist bright line spectra having a sharp peak in the wavelength band from 450 to 550 nm. However, it is not preferable to use the bright line spectra in the 450–550 nm wavelength band because the bright line spectra in this wavelength band is likely to be affected by displacement of the optical element with time, as mentioned above.

(4) In the embodiment, a light source for measuring the spectral characteristics and a light source for measuring the wavelength shift correction amount are identical. Alternatively, a light source for measuring the wavelength shift correction amount may be provided independently of the light source for measuring the spectral characteristics. In the altered arrangement, an element other than the xenon flash lamp may be used as the light source for measuring the wavelength shift correction amount.

As an exemplified altered arrangement, a light source having such bright line spectra as a mercury lamp, a krypton lamp, a helium lamp and the like, and a light source such as a laser for outputting light in a specific wavelength band may be used. A further exemplified altered arrangement is such that provided is a filter which absorbs light in a specific wavelength band such as a didymium filter and a holmium filter to a tungsten lamp to thereby provide the wavelength band with a peak.

(5) In the embodiment and modifications, it may be preferable to obtain a relationship between a wavelength shift amount at the wavelength 764 nm and an average wavelength shift amount with respect to the whole measured wavelength bands in advance.

For instance, referring to FIG. 1, as long as the displacement of the sample light sensor array 36 to light diffused by the spectral device composed of the grating member 35 and the like is caused by mechanical change such as deformation of the housing (e.g., the housing 71 shown in FIG. 13), wavelength shift with respect to each sensor of the sample light sensor array 36 is inevitable.

The wavelength shift amount to the central wavelength of each sensor due to such a positional displacement can be easily obtained with use of the known optical simulation software such as CODEV.

Accordingly, a relationship between a wavelength shift amount caused around the bright line spectra e.g. at a bright line spectrum at the wavelength 764 nm in the wavelength band of 700 nm or longer and an average wavelength shift amount with respect to the entirety of the measured wavelength bands is obtained in advance based on the wavelength shift amount which has been obtained with respect to each sensor for storage in the memory unit 61.

In performing the wavelength shift correction, an average wavelength shift correction amount in the measured wavelength bands is obtained based on the wavelength shift correction amount obtained with use of the bright line spectra in the wavelength band of 700 nm or longer e.g. the bright line spectrum at the wavelength 764 nm and on the aforementioned relationship stored in the memory unit 61.

According to the above arrangement, proper wavelength shift correction can be performed over the whole measured wavelength bands. In the arrangement where the wavelength shift amount in the central portion of the wavelength band to be measured is actually measured with use of a reference sample of an orange color, the above operation is not necessary.

(6) In the above embodiment, the spectral colorimeter 1 is adapted to measure spectral reflection characteristics of the sample 2. Alternatively, the spectral colorimeter 1 may be adapted to measure spectral transmission characteristics of the sample 2. The altered arrangement is constructed in such a manner that light that has transmitted through the sample 2 is guided to the sample light separator 33.

(7) In the embodiment, the wavelength shift correction amount is obtained by establishing a correlation value between the differential waveform of the current spectral profile and the differential waveform of each spectral profile of the reference spectral profile group, by extracting the spectral profile which shows a maximal correlation, and by setting the wavelength shift amount of the spectral profile showing the maximal correlation as the wavelength shift correction amount. The method for obtaining the wavelength shift correction amount is not limited to the above.

Figure 17:
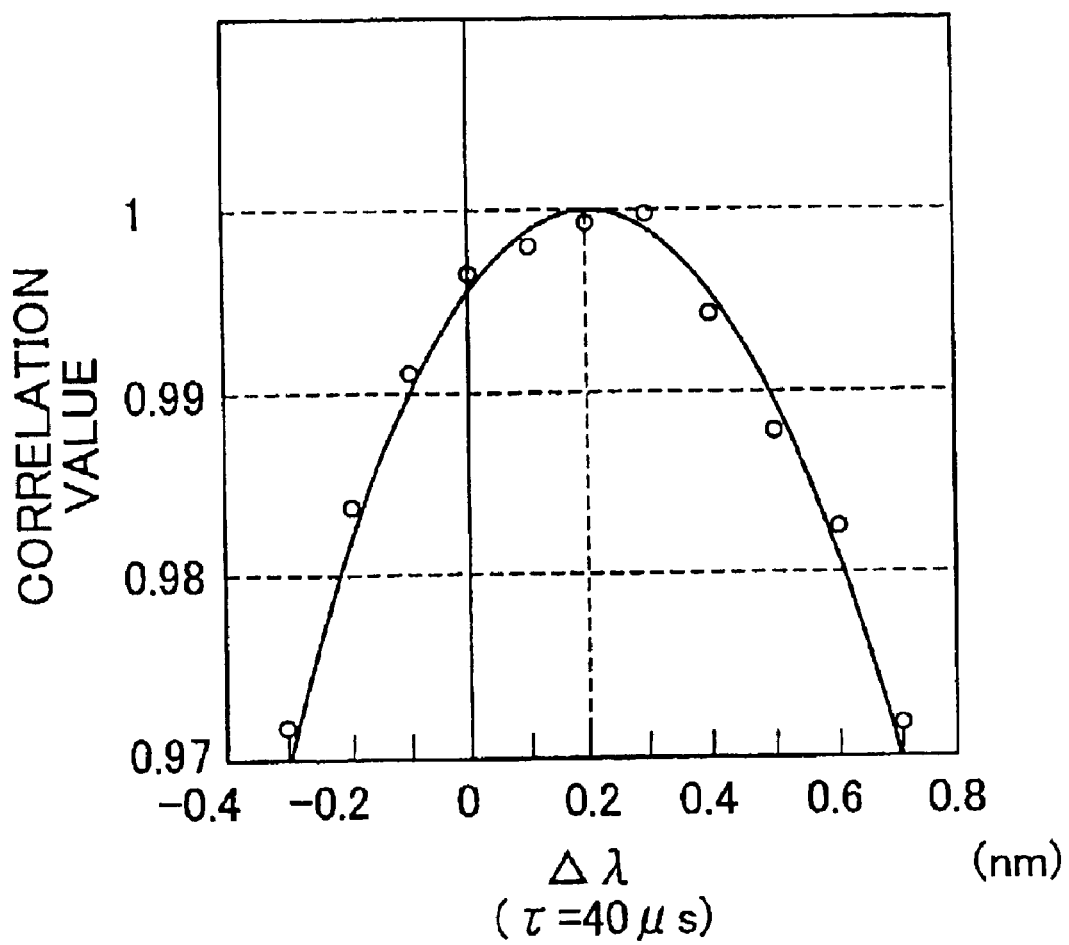
FIG. 17 is a diagram explaining an alternative method for obtaining a wavelength shift correction amount.

Specifically, FIG. 17 explains an alternative method for obtaining a wavelength shift correction amount. In this method, first, a correlation value between the differential waveform of the current spectral profile and the differential waveform of each spectral profile of the reference spectral profile group is obtained in the similar manner as the embodiment. In FIG. 17, the thus obtained correlation values represented by the circles ○ are plotted. Subsequently, the relationship between the wavelength shift amount $\Delta\lambda$ and the corresponding correlation value is approximated according to a quadratic function defined in Equation (15) in which the wavelength shift amount $\Delta\lambda$ is variable $$f(\Delta\lambda)=a(\Delta\lambda-b)^2+c \tag{15}$$

where a, b, c are constants determined by least-square method. In the computation, the constant b at which the value of the quadratic function is maximal is set as the wavelength shift amount.

In the embodiment, correction is performed based on the spectral profile showing a maximal correlation. In the altered arrangement, the wavelength shift correction amount to be used for the current spectral profile is calculated by using the correlation values in association with all the spectral profiles of the reference spectral profile group. Thereby, influence resulting from measurement error in the correlation data can be lessened. Furthermore, as shown in FIG. 17, the arrangement is advantageous in suppressing an error that may be caused in an attempt to lessen the variation of the correlation value to the variation of the wavelength shift amount which may likely to appear in the vicinity of the maximal correlation value.

In the above description, the function for approximation is the quadratic function. Alternatively, it is possible to perform approximation with an appropriate function in which the wavelength shift amount is variable and to set the wavelength shift amount at which the function shows the maximal value as the wavelength shift correction amount.

As described above, a novel spectral characteristic measuring apparatus comprises an illuminator, an illuminator controller for controlling the illuminator, a light separator for separating rays of the light from the sample according to wavelengths, a light receiver for outputting a spectral profile being formed by a plurality of light receiving signals. The light receiver includes an array of photoelectric conversion elements arrayed at a certain interval in a wavelength diffusing direction of the light separator to receive rays of light in the different wavelengths so as to output a light receiving signal corresponding to a received light intensity.

The apparatus is further provided with a spectral sensitivity storage unit for storing spectral sensitivities of the photoelectric conversion elements; a spectral characteristic calculator for calculating a spectral characteristic of the sample in a predetermined wavelength band for measurement with use of the spectral profile and the spectral sensitivities of the photoelectric conversion elements; a reference spectral profile group storage unit for storing a reference spectral profile group including a spectral profile in a specific wavelength band including at least a specific wavelength which is output from the light receiver when the light receiver receives light from a light source having a light intensity peak at the specific wavelength in an initial state of the apparatus, and a plurality of spectral profiles in the specific wavelength band to be output from the light receiver at each displaced position when the light receiver is displaced relative to the light separator in the wavelength diffusing direction at a certain pitch stepwise; a correction controller for controlling the light source to emit light in a calibratable state of the apparatus after the initial state thereof; and a correction amount calculator for comparing a spectral profile for correction which is output from the light receiver when the light source is caused to emit light, and each profile of the spectral profile group stored in the reference spectral profile group storage unit in the specific wavelength band, and which sets a shift amount corresponding to the spectral profile which is stored in the reference spectral profile group storage unit and is most approximate to the corrective spectral profile as a wavelength shift correction amount to correct the relative displacement of the light receiver after the initial state of the apparatus.

In this arrangement, in the initial state of the apparatus, e.g., in a production process thereof, obtained is the reference spectral profile group including the spectral profile in the specific wavelength band including at least the one specific wavelength which is output from the light receiver when the light receiver receives light from the light source having a light intensity peak at the specific wavelength, and a plurality of spectral profiles in the specific wavelength band to be output from the light receiver at each displaced position in the case where the light receiver is displaced to the light separator in the wavelength diffusing direction at a certain pitch stepwise. The thus obtained reference spectral profile group is stored in the reference spectral profile group storage unit.

Compared is the corrective spectral profile which is output from the light receiver when the light source is caused to emit light in a calibratable state of the apparatus after the initial state thereof with each profile of the spectral profile group stored in the reference spectral profile group storage unit in the specific wavelength band, and obtained is the shift amount corresponding to the spectral profile which is most approximate to the corrective spectral profile as the wavelength shift correction amount.

With this arrangement, even if the light receiver is displaced to the light separator in the wavelength diffusing direction, thereby causing shift of the spectral sensitivities of the photoelectric conversion elements in the wavelength diffusing direction, a wavelength shift correction amount can be obtained without using a reference color sample as required in the conventional art. As a result, a user is easily alerted of such shift in advance, or is enabled to perform necessary correction easily.

The light source may include a light source which outputs light at a specific wavelength such as a laser, and an arrangement in which a filter which absorbs light at a specific wavelength such as a didymium filter and a holmium filter is mounted to a tungsten lamp to provide the specific wavelength band with a peak.

The light source may preferably have a spectral intensity distribution including continuous spectra and a bright line spectrum at the specific wavelength. The light source is the illuminator.

This arrangement enables to simplify the construction of the apparatus because there is no need of providing a light source in addition to an illuminator. The light source may include a light source having a bright line spectrum, such as a xenon lamp, a mercury lamp, a krypton lamp, and a helium lamp.

The light source may preferably include a flash lamp operable to emit light in an array of pulses. The illuminator controller controls the flash lamp to emit light for a first duration. The correction controller controls the flash lamp to emit light for a second duration, the second duration being shorter than the first duration.

This arrangement enables to reduce an influence resulting from a continuous spectrum in comparing the corrective spectral profile with the spectral profile in the reference spectral profile group by utilizing the fact that the shorter the emission duration is, the larger the relative intensity of a bright line spectrum to a continuous spectrum is with respect to the spectral intensity distribution of the flash lamp. This arrangement enables to perform wavelength shift correction in a fine manner in obtaining the spectral profile which is most approximate to the corrective spectral profile.

Using a xenon flash lamp as the flash lamp enables to optimally measure a spectral reflection characteristic and a spectral transmittance characteristic of a sample. In this case, setting the specific wavelength at a wavelength corresponding to the bright line spectrum in the wavelength band of 700 nm or longer enables to obtain a wavelength shift correction amount without considering an influence resulting from deterioration of emission efficiency of a xenon flash lamp with time, which is conspicuous in a short wavelength band, and deterioration of an optical element such as a light separator, a light receiver, and an illuminator with time.

The light source may be provided with a xenon flash lamp, and the specific wavelength may be provided with a wavelength corresponding to the bright line spectrum in a wavelength band of 700 nm or longer. The apparatus may be preferably further provided with a shift amount storage unit for storing a correlation between a shift amount of the bright line spectrum in the wavelength band of 700 nm or longer in the wavelength diffusing direction and an average wavelength shift amount with respect to an entirety of the wavelength band for measurement when the light receiver is displaced relative to the light separator in the wavelength diffusing direction after the initial state of the apparatus. The correction amount calculator calculates an average wavelength shift amount with respect to the entirety of the wavelength band for measurement based on the shift amount corresponding to the spectral profile which is most approximate to the corrective spectral profile, based on the correlations stored in the shift amount storage unit to set the average wavelength shift amount as the wavelength shift correction amount.

In this arrangement, the average wavelength shift amount with respect to the entirety of the wavelength band for measurement is obtained based on the shift amount corresponding to the spectral profile which is most approximate to the corrective spectral profile, based on the correlation between the shift amount of the bright line spectrum in the wavelength band of 700 nm or longer in the wavelength diffusing direction when the light receiver is displaced to the light separator in the wavelength diffusing direction after the initial state of the apparatus, and the average wavelength shift amount. The thus obtained average wavelength shift amount is set as the wavelength shift correction amount. Thus, the wavelength shift correction can be optimally performed with respect to the entirety of the wavelength band for measurement.

The correction amount calculator may preferably calculate a shift amount corresponding to the spectral profile which gives a highest correlation between differential data with respect to a wavelength of the corrective spectral profile and differential data with respect to a wavelength of each spectral profile stored in the reference spectral profile group storage unit to set the shift amount as the wavelength shift correction amount.

In this arrangement, used are the differential data with respect to the wavelength of the corrective spectral profile and the differential data with respect to the wavelength of each spectral profile stored in the reference spectral profile group storage unit. This arrangement enables to suppress an influence resulting from a continuous spectrum, and enables to provide a correlation value which precisely reflects wavelength shift, thus providing a wavelength shift correction amount with high precision.

In the above arrangement, the reference spectral profile group storage unit may merely store differential data with respect to a wavelength of each spectral profile in the reference spectral profile group.

The correction amount calculator may preferably calculate a correlation value between differential data with respect to a wavelength of the corrective spectral profile and differential data with respect to a wavelength of each spectral profile stored in the reference spectral profile group storage unit, approximates each of the correlation values according to a certain function in which the shift amount is used as a variant, and sets a shift amount which gives a maximal value among the approximation results as the wavelength shift correction amount.

In this arrangement, the correlation value between the differential data with respect to the wavelength of the corrective spectral profile and the differential data with respect to the wavelength of each spectral profile stored in the reference spectral profile group storage unit is obtained, each correlation value is approximated according to the function in which the shift amount is used as a variant, and a shift amount which gives a maximal value among the approximation results is set as the wavelength shift correction amount. In this arrangement, the wavelength shift correction amount corresponding to the corrective spectral profile is obtained based on the correlation values with respect to all the spectral profiles in the reference spectral profile group. Accordingly, this arrangement enables to reduce an influence resulting from measurement error contained in the correlation data. The function for approximation may include a quadratic function.

The plurality of spectral profiles in the specific wavelength band which are stored in the reference spectral profile group storage unit and are output from the light receiver at each displaced position may be preferably obtained by measuring a spectral intensity distribution of the light source, measuring the spectral sensitivities of the photoelectric conversion elements, numerically synthesizing the plurality of spectral sensitivities by shifting each spectral sensitivity at a certain pitch stepwise in the wavelength diffusing direction, and by using the plurality of spectral sensitivities obtained by the synthesis and the spectral intensity distribution of the light source obtained by the measurement.

In this arrangement, the plurality of spectral profiles in the specific wavelength band to be output from the light receiver at each displaced position are obtained by numerically synthesizing the plurality of spectral sensitivities obtained by shifting the actually measured spectral sensitivities of the photoelectric conversion elements at a certain pitch stepwise in the wavelength diffusing direction, and by using the plurality of spectral sensitivities obtained by the synthesis and the spectral intensity distribution of the light source obtained by the measurement. With this arrangement, the reference spectral profile group can be obtained easily without actually mechanically displacing the plurality of photoelectric conversion elements to the light separator in the wavelength diffusing direction.

The corrective spectral profile may be preferably obtained in a first calibratable state of the apparatus in which a white plate for calibration is disposed at a sample opening of the apparatus in place of the sample in the case where the light separator separates the reflected light from the sample prior to measurement of the spectral characteristic of the sample which is implemented after the initial state of the apparatus, and is obtained in a second calibratable state of the apparatus in which light is allowed to transmit through the sample opening in the case where the light separator separates transmitted light through the sample opening.

In this arrangement, the corrective spectral profile is obtained in the first calibratable state of the apparatus in which the white plate for calibration is disposed at the sample opening of the apparatus in place of the sample in the case where the light separator separates the reflected light from the sample prior to measurement of the spectral characteristic of the sample which is implemented after the initial state of the apparatus, and is obtained in the second calibratable state of the apparatus in which light is allowed to transmit through the sample opening without disposing the sample thereat in the case where the light separator separates transmitted light through the sample opening. This arrangement enables a user to obtain a wavelength shift correction amount by measuring a current spectral profile in performing white calibration. This arrangement enables the user to obtain the wavelength shift correction amount easily without performing an additional operation. It should be appreciated that the calibratable state where light is allowed to transmit is obtainable by disposing a transparent plate at the sample opening or without disposing a sample at the sample opening.

The apparatus may be further provided with a correction amount storage unit for storing a wavelength shift correction amount obtained by the correction amount calculator. The spectral characteristic calculator calculates a spectral characteristic of the sample based on spectral sensitivities which are shifted from the spectral sensitivities of the photoelectric conversion elements by the wavelength shift correction amount in the case where the wavelength shift correction amount is stored in the correction amount storage unit.

In this arrangement, the spectral characteristic of the sample is calculated based on the spectral sensitivities obtained by shifting the spectral sensitivities of the photoelectric conversion elements in the wavelength diffusing direction by the wavelength shift correction amount stored in the correction amount storage unit. With this arrangement, even if the spectral sensitivities of the photoelectric conversion elements are varied in the wavelength diffusing direction by relative displacement of the light receiver to the light separator, the spectral characteristic of the sample can be obtained precisely.

The apparatus may be further provided with a correction amount storage unit for storing a wavelength shift correction amount obtained by the correction amount calculator. The spectral characteristic calculator calculates a spectral characteristic of the sample based on spectral sensitivities which are shifted from the spectral sensitivities of the photoelectric conversion elements by an amount set based on the wavelength shift correction amount in the case where the wavelength shift correction amount stored in the correction amount storage unit exceeds a certain value.

In this arrangement, the spectral characteristic of the sample is calculated based on the spectral sensitivities obtained by shifting the spectral sensitivities of the photoelectric conversion elements in the wavelength diffusing direction by the amount set based on the wavelength shift correction amount in the case where the wavelength shift correction amount stored in the correction amount storage unit exceeds the predetermined value. With this arrangement, as far as the wavelength shift correction amount does not exceed the predetermined value, the spectral characteristic of the sample is calculated based on the spectral sensitivities of the photoelectric conversion elements stored in the spectral sensitivity storage unit, which enables to maintain continuity with respect to the measurement results. On the other hand, in the case where the wavelength shift correction amount exceeds the predetermined value, the spectral characteristic of the sample is calculated based on the amount set based on the wavelength shift correction amount, e.g., the predetermined value or based on the spectral sensitivities obtained by shifting the spectral sensitivities of the photoelectric conversion elements by an amount which does not exceed the predetermined value. This arrangement enables to prevent loss of continuity with respect to the measurement results.

It may be preferable to provide a designator in the above arrangement which designates the predetermined value in response to an external manipulation by the user. With this arrangement, the user can optionally prioritize maintaining continuity with respect to measurement results or performing wavelength shift correction.

The apparatus may further comprise an alert unit which alerts a user that the wavelength shift correction amount obtained by the correction amount calculator exceeds the predetermined value. With this arrangement, the user is notified of the fact that the wavelength shift correction amount exceeds the predetermined value. This arrangement enables the user to take measures such as requesting of the manufacturer of the apparatus maintenance of the apparatus. The predetermined value may be such a relatively large value that maintenance is more desirable than correction.

Also, a novel method is adapted for correcting a wavelength shift of a spectral characteristic measuring apparatus. The apparatus comprises: an illuminator which illuminates a sample to be measured; an illuminator controller which controls the illuminator to emit light; a light separator which separates rays of the light from the sample according to wavelengths; a light receiver including an array of photoelectric conversion elements arrayed at a certain interval in a wavelength diffusing direction of the light separator to receive the rays of light in the different wavelengths so as to output a light receiving signal corresponding to a received light intensity, the light receiver outputting a spectral profile being formed by a plurality of light receiving signals; a spectral sensitivity storage unit which stores spectral sensitivities of the photoelectric conversion elements; and a spectral characteristic calculator which calculates a spectral characteristic of the sample in a predetermined wavelength band for measurement with use of the spectral profile and the spectral sensitivities of the photoelectric conversion elements. The method comprises the steps of: storing a reference spectral profile group including a spectral profile in a specific wavelength band including at least a specific wavelength which is output from the light receiver when the light receiver receives light from a light source having a light intensity peak at the specific wavelength in an initial state of the apparatus, and a plurality of spectral profiles in the specific wavelength band to be output from the light receiver at each displaced position when the light receiver is displaced relative to the light separator in the wavelength diffusing direction at a certain pitch stepwise; comparing a spectral profile for correction which is output from the light receiver when the light source is caused to emit light in a calibratable state of the apparatus after the initial state thereof with each spectral profile in the reference spectral profile group in the specific wavelength band; and setting a shift amount corresponding to the spectral profile in the reference spectral profile group which is most approximate to the corrective spectral profile as a wavelength shift correction amount to correct the relative displacement of the light receiver after the initial state of the apparatus.

The illuminator illuminates the sample, the light separator separates the light from the sample according to the wavelength bands, the light receiver including an array of photoelectric conversion elements arrayed at a certain interval in the wavelength diffusing direction of the light separator receives the light separated by the light separator, and the light receiver outputs a spectral profile consisting of a plurality of the light receiving signals corresponding to the light intensities output from the photoelectric conversion elements in the respective wavelength bands to calculate the spectral characteristic of the sample in the wavelength band for measurement based on the spectral profile and the spectral sensitivities of the photoelectric conversion elements.

In the initial state of the apparatus, e.g., in a production process thereof, obtained is a reference spectral profile group including a spectral profile in the specific wavelength band including at least one specific wavelength which is output from the light receiver when the light receiver receives light from the light source having a light intensity peak at the specific wavelength, and a plurality of spectral profiles in the specific wavelength band to be output from the light receiver at each displaced position when the light receiver is displaced relative to the light separator in the wavelength diffusing direction at a certain pitch stepwise for storage.

When the user compares the corrective spectral profile which is output from the light receiver when the light source is caused to emit light in a calibratable state of the apparatus after the initial state thereof with each spectral profile stored in the reference spectral profile group storage unit in the specific wavelength band, obtainable is the shift amount of the light receiver corresponding to the spectral profile in the reference spectral profile group which is most approximate to the corrective spectral profile as the wavelength shift correction amount Even if the light receiver is displaced to the light separator in the wavelength diffusing direction, thereby causing shift of the spectral sensitivities of the photoelectric conversion elements in the wavelength diffusing direction, a wavelength shift correction amount can be obtained without using a reference color sample as required in the conventional art. As a result, a user is easily alerted of such shift in advance, or is enabled to perform necessary correction easily.

The plurality of spectral profiles in the specific wavelength band to be output from the light receiver at each displaced position may be preferably obtained by: measuring a spectral intensity distribution of the light source; measuring the spectral sensitivities of the photoelectric conversion elements; numerically synthesizing a plurality of spectral sensitivities by shifting the spectral sensitivities of the photoelectric conversion elements at a certain pitch in the wavelength diffusing direction stepwise; and using the plurality of spectral sensitivities obtained by the synthesis and the spectral intensity distribution of the light source obtained by the measurement.

The plurality of spectral profiles in the specific wavelength band to be output from the light receiver at each displaced position are obtained by numerically synthesizing the plurality of spectral sensitivities obtained by shifting the actually measured spectral sensitivities of the photoelectric conversion elements at a certain pitch stepwise in the wavelength diffusing direction, and by using the plurality of spectral sensitivities obtained by the synthesis and the spectral intensity distribution of the light source obtained by the measurement. With this arrangement, the reference spectral profile group can be obtained easily without actually mechanically displacing the plurality of photoelectric conversion elements to the light separator in the wavelength diffusing direction.

Further, a novel method is adapted for correcting a wavelength shift of a spectral characteristic measuring apparatus. The apparatus comprises: an illuminator which illuminates a sample to be measured; an illuminator controller which controls the illuminator to emit light; a light separator which separates rays of the light from the sample according to wavelength bands; a light receiver including an array of photoelectric conversion elements arrayed at a certain interval in a wavelength diffusing direction of the light separator to receive the rays of light in different wavelengths so as to output a light receiving signal corresponding to a received light intensity, the light receiver outputting a spectral profile including a plurality of the light receiving signals; and a spectral characteristic calculator which calculates a spectral characteristic of the sample in a predetermined wavelength band for measurement with use of the spectral profile.

The method comprises the steps of: measuring a spectral intensity distribution of each illuminator of a plurality of spectral characteristic measuring apparatus to select at least one of spectral intensity distributions based on measurement results; obtaining a spectral profile group including a plurality of spectral profiles in the specific wavelength band to be output from the light receiver by measuring spectral sensitivities of the photoelectric conversion elements with respect to a spectral characteristic measuring apparatus in an initial state thereof to which a wavelength shift correction is to be implemented, numerically synthesizing a plurality of spectral sensitivities by shifting the spectral sensitivities at a certain pitch stepwise in the wavelength diffusing direction and by using the plurality of spectral sensitivities obtained by the synthesis, the spectral sensitivities obtained by the measurement, and the selected spectral intensity distribution; comparing the corrective spectral profile output from the light receiver when the illuminator is caused to emit light in a calibratable state of the apparatus with each spectral profile in the spectral profile group in the specific wavelength band; and storing in advance a spectral profile group in the specific wavelength band which has a most approximate spectral profile to the corrective spectral profile with respect to a spectral intensity distribution as a reference spectral group of the spectral characteristic measuring apparatus to which a wavelength shift correction is to be implemented.

A wavelength shift correction is performed with respect to a spectral characteristic measuring apparatus after the initial state thereof to which a wavelength shift correction is to implemented by: comparing the corrective spectral profile output from the light receiver when the illuminator is caused to emit light in the calibratable state of the apparatus with each spectral profile in the stored reference spectral profile group in the specific wavelength band; and setting a shift amount corresponding to the spectral profile in the reference spectral profile group which is most approximate to the corrective spectral profile as a wavelength shift correction amount.

In this method, first, the spectral intensity distribution of each illuminator of the plurality of the spectral characteristic measuring apparatus is measured, and at least one of the spectral intensity distributions e.g., a typical or an average spectral intensity distribution is selected based on the measurement results. Alternatively, it is possible to select all the spectral intensity distributions of the plurality of spectral characteristic measuring apparatus.

Spectral sensitivities of the photoelectric conversion elements are measured with respect to the apparatus in an initial state thereof to which a wavelength shift correction is to be implemented. A plurality of spectral sensitivities are numerically synthesized by shifting the spectral sensitivities at a certain pitch stepwise in the wavelength diffusing direction. Then, a spectral profile group including a plurality of spectral profiles in the specific wavelength band to be output from the light receiver is obtained by using the plurality of spectral sensitivities obtained by the synthesis, the spectral sensitivities obtained by the measurement, and the selected spectral intensity distribution.

The corrective spectral profile output from the light receiver when the illuminator is caused to emit light in a calibratable state of the apparatus is compared with each spectral profile in the spectral profile group in the specific wavelength band. Then, stored in advance is a spectral profile group in the specific wavelength band which has a most approximate spectral profile to the corrective spectral profile with respect to the spectral intensity distribution as a reference spectral group of the spectral characteristic measuring apparatus to which a wavelength shift correction is to be implemented.

Subsequently, in performing a wavelength shift correction with respect to the apparatus after the initial state thereof to which a wavelength shift correction is to be implemented, the corrective spectral profile output from the light receiver when the illuminator is caused to emit light in the calibratable state of the apparatus is compared with each spectral profile in the stored reference spectral profile group in the specific wavelength band. Then, a shift amount corresponding to the spectral profile in the reference spectral profile group which is most approximate to the corrective spectral profile is set as a wavelength shift correction amount.

Since there is no need of measuring the spectral intensity distribution of each illuminator of spectral characteristic measuring apparatus to which a wavelength shift correction is to be performed, a reference spectral profile group can be obtained easily. Furthermore, in the above arrangement, the spectral intensity distributions of the illuminators of the plurality of spectral characteristic measuring apparatus are measured in advance, and the spectral profile group having the spectral profile which is most approximate to the corrective spectral profile with respect to the spectral intensity distribution is set as the reference spectral profile group. With this arrangement, even if the spectral intensity distributions of the illuminators of the spectral characteristic measuring apparatus to which a wavelength shift correction is to be implemented are varied, precision deterioration in wavelength shift correction can be suppressed.

There may be further provided the steps of: selecting a spectral characteristic measuring apparatus which gives a typical spectral intensity distribution with respect to the measurement results of the spectral intensity distribution of each illuminator of the plurality of spectral characteristic measuring apparatus; measuring a spectral intensity distribution in which the emission duration of the illuminator is changed stepwise at a certain pitch with respect to the selected spectral characteristic measuring apparatus; obtaining a spectral profile group including a plurality of spectral profiles in the specific wavelength band to be output from the light receiver by measuring spectral sensitivities of the photoelectric conversion elements with respect to the apparatus in an initial state thereof to which a wavelength shift correction is to be implemented, numerically synthesizing a plurality of spectral sensitivities by shifting the spectral sensitivities stepwise at a certain pitch in the wavelength diffusing direction, and by using the plurality of spectral sensitivities obtained by the synthesis, the spectral sensitivities obtained by the measurement, and the spectral intensity distribution in each emission duration; comparing a corrective spectral profile output from the light receiver when the illuminator is caused to emit light in a calibratable state of the apparatus with each spectral profile in the reference spectral profile group in the specific wavelength band; and storing in advance the spectral profile group in the specific wavelength band which has a most approximate spectral profile to the corrective spectral profile with respect to the emission duration as a reference spectral profile group of the apparatus to which a wavelength shift correction is to be implemented.

A spectral characteristic measuring apparatus which gives a typical spectral intensity distribution is selected based on the measurement results of the spectral intensity distribution of each illuminator of the plurality of spectral characteristic measuring apparatus.

Then, spectral intensity distributions obtained by changing the emission duration of the illuminator stepwise at a certain pitch with respect to a reference duration are measured with respect to the selected spectral characteristic measuring apparatus.

The spectral sensitivities of the photoelectric conversion elements are measured, a plurality of spectral sensitivities are numerically synthesized by shifting the spectral sensitivities stepwise at a certain pitch in the wavelength diffusing direction, and a spectral profile group including a plurality of spectral profiles in the specific wavelength band to be output from the light receiver is obtained based on the plurality of spectral sensitivities obtained by the synthesis and the spectral intensity distributions at the respective emission durations.

Furthermore, a corrective spectral profile output from the light receiver when the illuminator is caused to emit light in a calibratable state of the apparatus is compared with each spectral profile in the reference spectral profile group in the specific wavelength band. Then, stored in advance is the spectral profile group in the specific wavelength band which has a most approximate spectral profile to the corrective spectral profile with respect to the emission duration as a reference spectral profile group of the apparatus to which a wavelength shift correction is to be implemented.

Even if the relative intensity of each illuminator of the plurality of spectral characteristic measuring apparatus to which a wavelength shift correction is to be implemented differs one from another, this arrangement enables to use the spectral profile group which has a most approximate spectral profile to the corrective spectral profile as a reference spectral profile group with respect to each of the apparatus by utilizing the fact that as the emission duration of the illuminator changes, the relative intensity of a bright line spectrum to a continuous spectrum changes. This arrangement enables to obtain a wavelength shift correction amount with high precision.

There may be further provided with the steps of: storing the wavelength shift correction amount; and calculating the spectral characteristic of the sample with use of spectral sensitivities which are shifted from the spectral sensitivities of the photoelectric conversion elements by the wavelength shift correction amount.

Even if the spectral sensitivities of the photoelectric conversion elements are shifted in the wavelength diffusing direction by relative displacement of the light receiver to the light separator in the wavelength diffusing direction, the spectral characteristic of the sample can be obtained accurately.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A spectral characteristic measuring apparatus comprising:

an illuminator for illuminating a sample to be measured;

an illuminator controller for controlling the illuminator to emit light from a light source;

a light separator for separating rays of the light from the sample according to wavelengths;

a light receiver including an array of photoelectric conversion elements arrayed at a certain interval in a wavelength diffusing direction of the light separator to receive rays of light in the different wavelengths so as to output a light receiving signal corresponding to a received light intensity, the light receiver outputting a spectral profile being formed by a plurality of light receiving signals;

a spectral sensitivity storage unit for storing spectral sensitivities of the photoelectric conversion elements;

a spectral characteristic calculator for calculating a spectral characteristic of the sample in a predetermined wavelength band for measurement with use of the spectral profile and the spectral sensitivities of the photoelectric conversion elements;

a reference spectral profile group storage unit for storing a reference spectral profile group including a spectral profile in a specific wavelength band including at least a specific wavelength which is output from the light receiver when the light receiver receives light from a the light source having a light intensity peak at the specific wavelength in an initial state of the apparatus, and a plurality of spectral profiles in the specific wavelength band to be output from the light receiver at each displaced position when the light receiver is displaced relative to the light separator in the wavelength diffusing direction at a certain pitch stepwise;

a correction controller for controlling the light source to emit light in a calibratable state of the apparatus, after the initial state thereof; and a correction amount calculator for comparing a spectral profile for correction which is output from the light receiver when the light source is caused to emit light, and each spectral profile stored in the reference spectral profile group storage unit in the specific wavelength band, and which sets a shift amount corresponding to the spectral profile which is stored in the reference spectral profile group storage unit and is most approximate to the corrective spectral profile as a wavelength shift correction amount to correct the relative displacement of the light receiver after the initial state of the apparatus.

2. The apparatus according to claim 1, wherein the light source has a spectral intensity distribution including continuous spectra and a bright line spectrum at the specific wavelength.

3. The apparatus according to claim 2, wherein the light source includes a flash lamp which is caused to emit light in an array of pulses, the illuminator controller controls the flash lamp to emit light for a first duration, and the correction controller controls the flash lamp to emit light for a second duration, the second duration being shorter than the first duration.

4. The apparatus according to claim 2, wherein:
the light source includes a xenon flash lamp; and
the specific wavelength includes a wavelength corresponding to the bright line spectrum in a wavelength band of 700 nm or longer;
the apparatus further comprising a shift amount storage unit for storing a correlation between a shift amount of the bright line spectrum in the wavelength band of 700 nm or longer in the wavelength diffusing direction and an average wavelength shift amount with respect to an entirety of the wavelength band for measurement when the light receiver is displaced relative to the light separator in the wavelength diffusing direction after the initial state of the apparatus;
wherein the correction amount calculator for calculating an average wavelength shift amount with respect to the entirety of the wavelength band for measurement based on the shift amount corresponding to the spectral profile which is most approximate to the corrective spectral profile, based on the correlations stored in the shift amount storage unit to set the average wavelength shift amount as the wavelength shift correction amount.

5. The apparatus according to claim 2, wherein the correction amount calculator calculates a shift amount corresponding to the spectral profile which gives a highest correlation between differential data with respect to a wavelength of the corrective spectral profile and differential data with respect to a wavelength of each spectral profile stored in the reference spectral profile group storage unit to set the shift amount as the wavelength shift correction amount.

6. The apparatus according to claim 2, wherein the correction amount calculator calculates a correlation value between differential data with respect to a wavelength of the corrective spectral profile and differential data with respect to a wavelength of each spectral profile stored in the reference spectral profile group storage unit, approximates each of the correlation values according to a certain function in which the shift amount is used as a variant, and sets a shift amount which gives a maximal value among the approximation results as the wavelength shift correction amount.

7. The apparatus according to claim 1, wherein the plurality of spectral profiles in the specific wavelength band which are stored in the reference spectral profile group storage unit and are output from the light receiver at each displaced position are obtained by measuring a spectral intensity distribution of the light source, measuring the spectral sensitivities of the photoelectric conversion elements, numerically synthesizing the plurality of spectral sensitivities by shifting each spectral sensitivity at a certain pitch stepwise in the wavelength diffusing direction, and by using the plurality of spectral sensitivities obtained by the synthesis and the spectral intensity distribution of the light source obtained by the measurement.

8. The apparatus according to claim 1, wherein the corrective spectral, profile is obtained in a first calibratable state of the apparatus in which a white plate for calibration is disposed at a sample opening of the apparatus in place of the sample in the case where the light separator separates the reflected light from the sample prior to measurement of the spectral characteristic of the sample which is implemented after the initial state of the apparatus, and is obtained in a second calibratable state of the apparatus in which light is allowed to transmit through the sample opening in the case where the light separator separates transmitted light through the sample opening.

9. The apparatus according to claim 1, further comprising a correction amount storage unit for storing a wavelength shift correction amount obtained by the correction amount calculator, wherein:
the spectral characteristic calculator calculates a spectral characteristic of the sample based on spectral sensitivities which are shifted from the spectral sensitivities of the photoelectric conversion elements by the wavelength shift correction amount in the case where the wavelength shift correction amount is stored in the correction amount storage unit.

10. The apparatus according to claim 1, further comprising a correction amount storage unit for storing a wavelength shift correction amount obtained by the correction amount calculator, wherein:
the spectral characteristic calculator calculates a spectral characteristic of the sample based on spectral sensitivities which are shifted from the spectral sensitivities of the photoelectric conversion elements by an amount set based on the wavelength shift correction amount in the case where the wavelength shift correction amount stored in the correction amount storage unit exceeds a certain value.

11. A method for correcting a wavelength shift of a spectral characteristic measuring apparatus which comprises:
an illuminator for illuminating a sample to be measured;

an illuminator controller for controlling the illuminator to emit light from a light source;

a light separator for separating rays of the light from the sample according to wavelengths;

a light receiver including an array of photoelectric conversion elements arrayed at a certain interval in a wavelength diffusing direction of the light separator to receive the rays of light in the different wavelengths so as to output a light receiving signal corresponding to a received light intensity, the light receiver outputting a spectral profile being formed by a plurality of light receiving signals;

a spectral sensitivity storage unit for storing spectral sensitivities of the photoelectric conversion elements; and a spectral characteristic calculator for calculating a spectral characteristic of the sample in a predetermined wavelength band for measurement with use of the spectral profile and the spectral sensitivities of the photoelectric conversion elements;

the method comprising the steps of:

storing a reference spectral profile group including a spectral profile in a specific wavelength band including at least a specific wavelength which is output from the light receiver when the light receiver receives light from the light source having a light intensity peak at the specific wavelength in an initial state of the apparatus, and a plurality of spectral profiles in the specific wavelength band to be output from the light receiver at each displaced position when the light receiver is displaced relative to the light separator in the wavelength diffusing direction at a certain pitch stepwise;

comparing a spectral profile for correction which is output from the light receiver when the light source is caused to emit light in a calibratable state of the apparatus after the initial state thereof with each spectral profile in the reference spectral profile group in the specific wavelength band; and setting a shift amount corresponding to the spectral profile in the reference spectral profile group which is most approximate to the corrective spectral profile as a wavelength shift correction amount to correct the relative displacement of the light receiver after the initial state of the apparatus.

12. The method according to claim 11, wherein the plurality of spectral profiles in the specific wavelength band to be output from the light receiver at each displaced position are obtained by:

measuring a spectral intensity distribution of the light source;

measuring the spectral sensitivities of the photoelectric conversion elements;

numerically synthesizing a plurality of spectral sensitivities by shifting the spectral sensitivities of the photoelectric conversion elements at a certain pitch in the wavelength diffusing direction stepwise; and using the plurality of spectral sensitivities obtained by the synthesis and the spectral intensity distribution of the light source obtained by the measurement.

13. The method according to claim 11, further comprising the steps of:

storing the wavelength shift correction amount; and calculating the spectral characteristic of the sample with use of spectral sensitivities which are shifted from the spectral sensitivities of the photoelectric conversion elements by the wavelength shift correction amount.

14. A method for correcting a wavelength shift of a spectral characteristic measuring apparatus which comprises:

an illuminator for illuminating a sample to be measured;

an illuminator controller for controlling the illuminator to emit light from a light source;

alight separator for separating rays of the light from the sample according to wavelength bands;

a light receiver including an array of photoelectric conversion elements arrayed at a certain interval in a wavelength diffusing direction of the light separator to receive the rays of light in different wavelengths so as to output a light receiving signal corresponding to a received light intensity, the light receiver outputting a spectral profile including a plurality of the light receiving signals; and a spectral characteristic calculator for calculating a spectral characteristic of the sample in a predetermined wavelength band for measurement with use of the spectral profile;

the method comprising the steps of:

measuring a spectral intensity distribution of each illuminator of a plurality of spectral characteristic measuring apparatus to select at least one of spectral intensity distributions based on measurement results;

obtaining a spectral profile group including a plurality of spectral profiles in the, specific wavelength band to be output from the light receiver by measuring spectral sensitivities of the photoelectric conversion elements with respect to a spectral characteristic measuring apparatus in an initial state thereof to which a wavelength shift correction is to be implemented, numerically synthesizing a plurality of spectral sensitivities by shifting the spectral sensitivities at a certain pitch stepwise in the wavelength diffusing direction and by using the plurality of spectral sensitivities obtained by the synthesis, the spectral sensitivities obtained by the measurement, and the selected spectral intensity distribution;

comparing a corrective spectral profile output from the light receiver when the illuminator is caused to emit light in a calibratable state of the apparatus with each spectral profile in the spectral profile group in the specific wavelength band; and storing in advance a spectral profile group in the specific wavelength band which has a most approximate spectral profile to the corrective spectral profile with respect to a spectral intensity distribution as a reference spectral profile group of the spectral characteristic measuring apparatus;

a wavelength shift correction being performed with respect to a spectral characteristic measuring apparatus after the initial state thereof to which the wavelength shift correction is to implemented by:

comparing the corrective spectral profile output from the light receiver when the illuminator is caused to emit light in the calibratable state of the apparatus with each spectral profile in the stored reference spectral profile group in the specific wavelength band; and setting a shift amount corresponding to the spectral profile in the reference spectral profile group which is most approximate to the corrective spectral profile as the wavelength shift correction amount.

15. The method according to claim 14, further comprising the steps of:

selecting a spectral characteristic measuring apparatus which gives a typical spectral intensity distribution with respect to the measurement results of the spectral intensity distribution of each illuminator of the plurality of spectral characteristic measuring apparatus;

measuring a spectral intensity distribution in which the emission duration of the illuminator is changed stepwise at a certain pitch with respect to the selected spectral characteristic measuring apparatus;

obtaining a spectral profile group including a plurality of spectral profiles in the specific wavelength band to be output from the light receiver by measuring spectral sensitivities of the photoelectric conversion elements with respect to the apparatus in an initial state thereof to which a wavelength shift correction is to be implemented, numerically synthesizing a plurality of spectral sensitivities by shifting the spectral sensitivities stepwise at a certain pitch in the wavelength diffusing direction, and by using the plurality of spectral sensitivities obtained by the synthesis, the spectral sensitivities obtained by the measurement, and the spectral intensity distribution in each emission duration;

comparing a corrective spectral profile output from the light receiver when the illuminator is caused to emit light in a calibratable state of the apparatus with each spectral profile in the reference spectral profile group in the specific wavelength band; and storing in advance the spectral profile group in the specific wavelength band which has a most approximate spectral profile to the corrective spectral profile with respect to the emission duration as a reference spectral profile group of the apparatus to which a wavelength shift correction is to be implemented.

16. The method according to claim 14, further comprising the steps of:

storing the wavelength shift correction amount; and calculating the spectral characteristic of the sample with use of spectral sensitivities which are shifted from the spectral sensitivities of the photoelectric conversion elements by the wavelength shift correction amount.

* * * * *